United States Patent
Kitada et al.

(10) Patent No.: US 8,557,069 B2
(45) Date of Patent: Oct. 15, 2013

(54) OPTICAL DISPLAY DEVICE MANUFACTURING SYSTEM AND OPTICAL DISPLAY DEVICE MANUFACTURING METHOD

(75) Inventors: Kazuo Kitada, Ibaraki (JP); Tomokazu Yura, Ibaraki (JP); Satoru Koshio, Ibaraki (JP); Takuya Nakazono, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 12/922,803

(22) PCT Filed: Apr. 10, 2009

(86) PCT No.: PCT/JP2009/057370
§ 371 (c)(1),
(2), (4) Date: Sep. 15, 2010

(87) PCT Pub. No.: WO2009/128405
PCT Pub. Date: Oct. 22, 2009

(65) Prior Publication Data
US 2011/0005656 A1    Jan. 13, 2011

(30) Foreign Application Priority Data

Apr. 14, 2008 (JP) ................... 2008-104964
Mar. 30, 2009 (JP) ................... 2009-082629

(51) Int. Cl.
*B32B 41/00* (2006.01)
(52) U.S. Cl.
USPC .............. 156/64; 156/351; 156/367; 156/368
(58) Field of Classification Search
USPC ........... 156/64, 252, 253, 351, 360, 362, 364, 156/367, 368, 378, 379; 700/41, 42, 43, 45
See application file for complete search history.

(56) References Cited

U.S. PATENT DOCUMENTS

2009/0159175 A1    6/2009 Nakahira et al.

FOREIGN PATENT DOCUMENTS

| JP | 2005-024312 A | 1/2005 |
| JP | 2005-062165 A | 3/2005 |

(Continued)

OTHER PUBLICATIONS

Translation of JP 2007-140046 A, Published Jun. 7, 2007, Nitto Denko Corp.*

(Continued)

*Primary Examiner* — George Koch
(74) *Attorney, Agent, or Firm* — Westerman, Hattori, Daniels & Adrian, LLP

(57) ABSTRACT

Provided are an optical display device manufacturing system and an optical display device manufacturing method which can more preferably carry out a defect inspection. A detection condition of a defect in the inspection of an optical film before being bonded to an optical display unit carried out by a defect inspection apparatus (14, 24) is corrected based on the result of inspection of the optical display device with the optical film bonded, carried out by an inspection apparatus (30), and the optical film including the defects detected by the defect inspection apparatuses (14, 24) based on the corrected detection condition are excluded. Accordingly, since it is possible to adjust the standard of the defect inspection carried out by the defect inspection apparatus (14, 24) in conformity to the standard of the defect inspection which is later carried out by the inspection apparatus (30), it is possible to more preferably carry out the defect inspection, and it is possible to improve a yield ratio of the optical film.

10 Claims, 7 Drawing Sheets

(56) References Cited

FOREIGN PATENT DOCUMENTS

| JP | 2005-070605 A | 3/2005 |
|---|---|---|
| JP | 2005-114624 A | 4/2005 |
| JP | 2005-326323 A | 11/2005 |
| JP | 2007-140046 A | 6/2007 |
| JP | 2007-238438 A | 9/2007 |

OTHER PUBLICATIONS

Translation of JP 2005-024312 A, Published Jan. 27, 2005, Olympus Corp.*

Translation of JP 2005-326323 A, Published Nov. 24, 2005, Yokogawa Electric Corp.*

International Search Report of PCT/JP2009/057370, mailing date Jul. 14, 2009.

Japanese Office Action dated Mar. 2, 2011, issued in corresponding Japanese Patent Application No. 2009-082629.

Notification of Transmittal of Translation of the International Preliminary Report on Patentability (Form PCT/IB/338) of International Application No. PCT/JP2009/057370 mailed Dec. 9, 2010 with Forms PCT/IB/373 and PCT/ISA/237.

Chinese Office Action dated Aug. 30, 2012, issued in corresponding Chinese Patent Application No. 200980108296.6, with English translation (13 pages).

Taiwanese Office Action dated Oct. 4, 2012, issued in corresponding Taiwanese Patent Application No. 098112343, with English translation (13 pages).

* cited by examiner

Fig.5
(a) BEFORE FEEDBACK
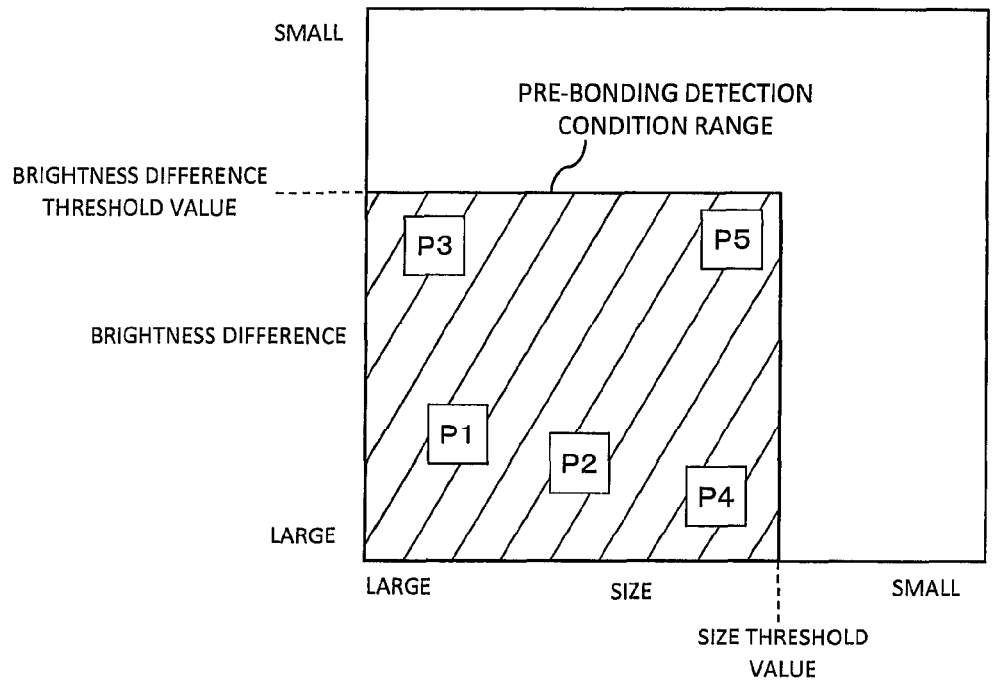
(b) AFTER FEEDBACK
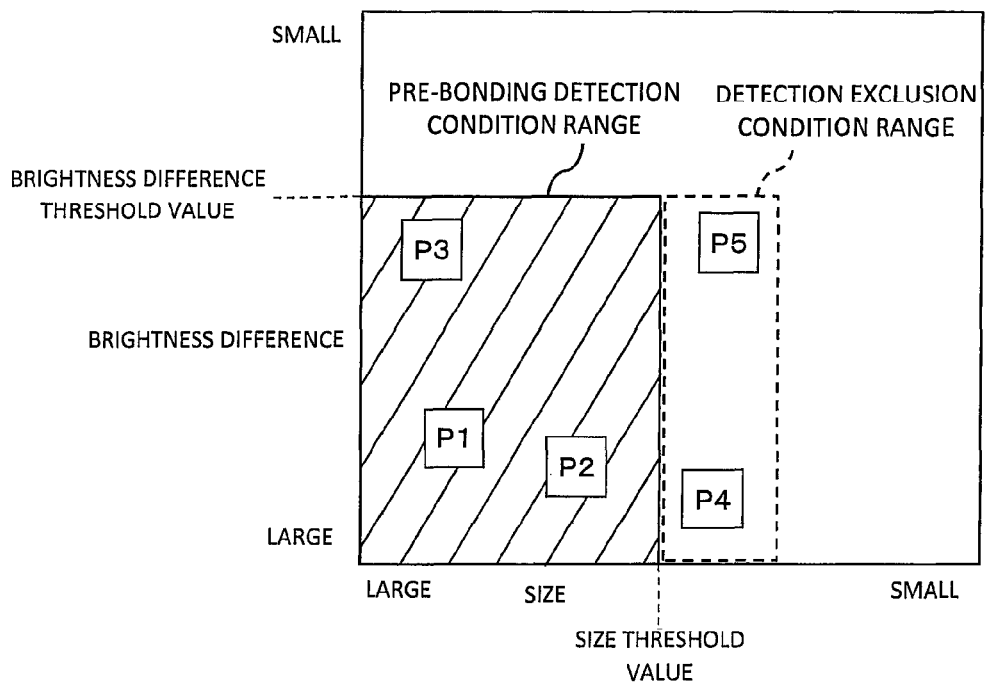

OPTICAL DISPLAY DEVICE MANUFACTURING SYSTEM AND OPTICAL DISPLAY DEVICE MANUFACTURING METHOD

This application is a national stage entry of PCT/JP2009/057370, filed on Apr. 10, 2009.

TECHNICAL FIELD

The invention relates to an optical display device manufacturing system and an optical display device manufacturing method for manufacturing an optical display device by delivering an optical film from a material roll formed by winding the optical film into a roll shape, and cutting the optical film into a predetermined size so as to be bonded to an optical display unit.

BACKGROUND ART

A production method of an optical display device mounted to a conventional liquid crystal display device is conceptually shown in FIG. 7. First in an optical filmmaker, a step produces a long (web-like) sheet material having an optical film as a material roll (#1). The concrete production step is a known production step, and a description thereof will not be given. As the long (web-like) sheet material, for example, there are a polarizing plate material, a retardation plate material, a laminated film material of the polarizing plate and the retardation plate, and the like which are used in a liquid crystal display device. Next, the material roll is slit to a predetermined size (a size in accordance with a size of the optical display unit) (#2). Next, the slit long material is cut to a fixed size in conformity to a size of the optical display unit (#3). Next, a step inspects an outer appearance of a piece of sheet material (an optical film) cut to the fixed size (#4). As the inspecting method, for example, there can be listed up a defect inspection in accordance with a visual observation, and an inspection using a known defect inspection apparatus. The defect means, for example, a dirty in a front face or an internal portion, a scratch, a special twisted defect like a hitting mark generated by biting a contaminant (which may be called as a knick), an air bubble, a contaminant or the like. Next, a step inspects a finished product (#5). The finished product inspection is an inspection in accordance with a quality standard having a severer non-defective determination than the outer appearance inspection. Next, a step works end faces in four sides of the sheet material of the piece of sheet material (#6). This step is carried out for preventing an adhesive or the like from running over from the end faces during transport. Next, a step cleanly packages the piece of sheet material under a clean room environment (#7). Next, a step packages for transport (a transport package) (#8). The piece of sheet material is produced as mentioned above, and is transported to a panel processing manufacturer.

In the panel processing manufacturer, a step dismounts the package of the piece of sheet material transported (#11). Next, a step inspects an outer appearance for inspecting the scratch, the dirt and the like generated at a time of transporting or dismounting the package (#12). The piece of sheet material which is determined as the non-defective by the inspection is fed to the next step. There is a case that the outer appearance inspection is omitted. An optical display unit (for example, a glass substrate unit in which a liquid crystal cell is enclosed) to which the piece of sheet material is bonded is previously produced, and the optical display unit is cleaned before the bonding step (#13).

A step bonds the piece of sheet material and the optical display unit (#14). A release film is peeled off from the piece of sheet material while leaving a pressure-sensitive adhesive layer, and it is bonded to one face of the optical display unit by using the pressure-sensitive adhesive layer as a bonding face. Further, it can be bonded to the other face of the optical display unit in the same manner. In the case of bonding to both the faces, the structure may be made such that the optical films having the same construction are bonded to the faces of the optical display unit, or the structure may be made such that the optical films having different constructions are bonded thereto. Next, a step carries out an inspection of the optical display device in the state in which the optical film is bonded and a defect inspection (#15). The optical display device which is determined as the non-defective in this inspection is fed to a mounting process (#16). On the other hand, a reworking process is applied to the optical display device which is determined as a defective (#17). In the reworking process, the optical film is peeled off from the optical display unit. The optical film is newly bonded to the reworked optical display unit (#14).

In the case of manufacturing a piece of sheet material in the optical film maker as mentioned above, there has been proposed a method of previously detecting a defect of the material roll, and printing a position information of the detected defect on the material roll in a form of a bar code, or storing the position information in a storage device (Patent Documents 1 and 2). In this method, it is possible to remove the portion including the defect in the polarizing plate from the manufacturing line by punching the polarizing plate based on the bar code or the position information read from the memory device.

In the production step mentioned above, since the optical film maker and the panel processing manufacturer exist in the separate places, the end face working, the packaging of the piece of sheet material, the package dismounting and the like are particularly necessary steps. However, there are a problem of a production cost increase caused by multiple steps, a problem of the scratch, the dust, the dirt and the like generated by the multiple steps and the transport, a necessity of the inspection step caused thereby, and a problem that it is necessary to store and manage many kinds of sheet materials as a stock.

As a method of solving the problems, there has been proposed Japanese Patent Application Laid-Open (JP-A) No. 2007-140046 (Patent Document 3). In accordance with this invention, the structure is provided with a supply portion pulling out and supplying a long sheet material from a material roll around which the long sheet material having an optical film corresponding to a member of an optical display device is wound, a detection portion detecting a defect of the long sheet material pulled out by the supply portion, a cutting work portion cutting the long sheet material based on a result of detection of the detection portion and working to an individual sheet material, a transfer portion transferring the sheet material cut by the cutting work portion for a bonding work, and a bonding work portion bonding the sheet material transferred by the transfer portion and an optical display unit corresponding to a member of an optical display device, and these portion are arranged on a continuous production line. In the structure mentioned above, it is possible to directly cut the long sheet material having the optical film into a desired size, and to bond the cut sheet material to the optical display unit. Accordingly, it is possible to directly package the long sheet material wound around the material roll so as to deliver, in place of the conventional step which stamps the long sheet material, tightly packages the stamped sheet material, and delivers to the panel processing manufacturer.

PRIOR ART DOCUMENTS

Patent Documents

Patent document 1: Japanese Unexamined Patent Publication No. 2005-62165
Patent document 2: Japanese Unexamined Patent Publication No. 2005-114624
Patent document 3: Japanese Unexamined Patent Publication No. 2007-140046

DISCLOSURE OF THE INVENTION

Problems to be Solved by the Invention

In the method as in Patent Documents 1 and 2 mentioned above, it is possible to manufacture the polarizing plate which does not include the defect as a piece of sheet material, by punching the polarizing plate based on the position information of the previously detected defect. However, at a time of actually bonding the piece of sheet material manufactured as mentioned above to the optical display unit, there is a possibility that a new defect is generated in the sheet material due to a problem of the scratch, the dust, the dirt and the like generated by the transport as mentioned above.

On the contrary, in the method as in Patent Document 3 mentioned above, since the material roll delivered to the panel processing manufacturer from the optical film maker is cut just before being bonded to the optical display unit, it is possible to inhibit the new defect from being generated according to the transport as mentioned above. However, even in the method mentioned above, in order to manufacture an optical display device having a higher quality, it is preferable to inspect the optical film which is taken out from the delivered material roll so as to be bonded to the optical display unit before being bonded to the optical display unit. Further, in addition to the inspection of the optical film before being bonded as mentioned above, it is conceivable that the optical display device with the optical film bonded is also inspected.

However, in the case that the defect inspection is carried out before and after the bonding as mentioned above, when a standard of the defect inspection before being bonded is higher than a standard of the defect inspection after being bonded, there is a case that a minor defect in such a level that is not detected as a defect in the defect inspection after being bonded is over detected in the defect inspection before being bonded. Further, this matter can be considered in the same manner in the case that the manufacturing step of the optical film and the processing step of the panel are carried out in the different lines even in the case that they are carried out by the same maker.

The present invention was devised in view of the foregoing circumstances, and an object of the present invention is to provide an optical display device manufacturing system and an optical display device manufacturing method which can more preferably carry out a defect inspection.

Means for Solving the Problems

As a result of devoting themselves to make a study for solving the problem mentioned above, the inventors run into a completion of the present invention mentioned below.

An optical display device manufacturing system according to a first aspect of the present invention relates to the optical display device manufacturing system for manufacturing an optical display device by delivering an optical film from a material roll formed by winding the optical film into a roll shape, and cutting the optical film into a predetermined size so as to be bonded to an optical display unit, the system comprising:

optical film inspection means for inspecting the optical film before being bonded to the optical display unit so as to detect a defect;

optical display device inspection means for inspecting the optical display device with the optical film bonded so as to detect a defect;

detection condition correcting means for correcting a detection condition used by the optical film inspection means to detect a defect of the optical film, based on a result of inspection of the optical display device inspection means; and rejection means for rejecting the optical film including the defect detected by the optical film inspection means based on the corrected detection condition.

According to the present invention, the detection condition of the defect in the inspection of the optical film before being bonded to the optical display unit carried out by the optical film inspection means is corrected based on the result of inspection of the optical display device with the optical film bonded, carried out by the optical display device inspection means, and the optical film including the defect detected by the optical film inspection means based on the corrected detection condition is rejected. Accordingly, since it is possible to adjust the standard of the defect inspection carried out by the optical film inspection means in conformity to the standard of the defect inspection which is later carried out by the optical display device inspection means, it is possible to more preferably carry out the defect inspection, and to improve a yield ratio of the optical display device.

An optical display device manufacturing system according to a second aspect of the present invention relates to the optical display device manufacturing system, comprising cutting means for cutting the optical film while avoiding the defect portion in such a manner that the defect detected by the optical film inspection means based on the corrected detection condition is not included in a region bonded to the optical display unit, wherein the rejection means rejects the optical film including the defect and being cut by the cutting means.

According to the present invention, it is possible to cut the optical film while avoiding the defect portion in such a manner as to prevent the defect detected by the optical film inspection means based on the corrected detection condition from being included within the region bonded to the optical display unit, and to reject the optical film including the defect and being cut. Accordingly, since it is possible to efficiently reject the portion including the defect of the optical film, it is possible to more improve the yield ratio of the optical film.

An optical display device manufacturing system according to a third aspect of the present invention relates to the optical display device manufacturing system, wherein the detection condition correcting means compares a result of inspection by the optical film inspection means with a result of inspection by the optical display device inspection means, and corrects the detection condition used by the optical film inspection means in such a manner that the optical film inspection means and the optical display device inspection means extract a defect satisfying a same standard in the optical film.

According to the present invention, since it is possible to make the standard of the defect inspection come near before and after the bonding by correcting the detection condition in such a manner that the optical film inspection means and the optical display device inspection means extract the defect satisfying the same standard in the optical film, it is possible to more preferably carry out the defect inspection.

An optical display device manufacturing system according to a fourth aspect of the present invention relates to the optical display device manufacturing system, wherein the optical film inspection means detects a defect only in the case that the defect included in the optical film satisfies the detection condition, and the detection condition correcting means excludes a condition corresponding to the defect from the detection condition in the case that the defect detected by the optical film inspection means is not detected by the optical display device inspection means.

According to the present invention, in the case that the defect which is detected by the optical film inspection means is not detected by the optical display device inspection means, the condition corresponding to the defect is excluded from the detection condition of the optical film inspection means. Accordingly, even in the case that the standard of the defect inspection before the bonding carried out by the optical film inspection means is higher than the standard of the defect inspection after the bonding carried out by the optical display device inspection means, it is possible to prevent a minor defect in such a level that is not detected as the defect in the defect inspection after the bonding from being over detected by the defect inspection before the bonding. Accordingly, it is possible to further preferably carry out the defect inspection.

An optical display device manufacturing system according to a fifth aspect of the present invention relates to the optical display device manufacturing system, wherein the detection condition is prescribed by brightness difference between the defect in the optical film and a periphery of the defect, and a size of the defect.

According to the present invention, in the case that the defect which is detected by the optical film inspection means is not detected by the optical display device inspection means, it is possible to exclude the condition corresponding to the defect from the detection condition of the optical film inspection means prescribed by brightness difference between the defect in the optical film and a periphery of the defect, and a size of the defect. In other words, it is possible to more preferably carry out the defect inspection by excluding the defect having a predetermined brightness difference and a predetermined size from the detection condition of the optical film inspection means, based on the result of inspection of the optical display device inspection means.

An optical display device manufacturing method according to a sixth aspect of the present invention relates to the optical display device manufacturing method for manufacturing an optical display device by delivering an optical film from a material roll formed by winding the optical film into a roll shape, and cutting the optical film into a predetermined size so as to be bonded to an optical display unit, the method comprising:

an optical film inspection step of inspecting the optical film before being bonded to the optical display unit so as to detect a defect;

an optical display device inspection step of inspecting the optical display device to which the optical film is bonded so as to detect a defect;

a detection condition correcting step of correcting a detection condition used in the optical film inspection step to detect a defect of the optical film in the optical film inspection step, based on a result of inspection of the optical display device inspection step; and a rejection step of rejecting the optical film including the defect detected in the optical film inspection step based on the corrected detection condition.

According to the present invention, an optical display device manufacturing method producing the same effects as the optical display device manufacturing system according to the first aspect of the present invention can be provided.

An optical display device manufacturing method according to a seventh aspect of the present invention relates to the optical display device manufacturing method, comprising a cutting step of cutting the optical film while avoiding the defect portion in such a manner that the defect detected in the optical film inspection step based on the corrected detection condition is not included in a region bonded to the optical display unit, wherein the rejection step is the step of rejecting the optical film including the defect and being cut in the cutting step.

According to the present invention, an optical display device manufacturing method producing the same effects as the optical display device manufacturing system according to the second aspect of the present invention can be provided.

An optical display device manufacturing method according to a eighth aspect of the present invention relates to the optical display device manufacturing method, wherein the detection condition correcting step is the step of comparing a result of inspection in the optical film inspection step with a result of inspection in the optical display device inspection step, and correcting the detection condition used in the optical film inspection step in such a manner that the optical film inspection step and the optical display device inspection step extract a defect satisfying a same standard in the optical film.

According to the present invention, an optical display device manufacturing method producing the same effects as the optical display device manufacturing system according to the third aspect of the present invention can be provided.

An optical display device manufacturing method according to a ninth aspect of the present invention relates to the optical display device manufacturing method, wherein the optical film inspection step is the step of detecting a defect only in the case that the defect included in the optical film satisfies the detection condition, and the detection condition correcting step is the step of excluding a condition corresponding to the defect from the detection condition in the case that the defect detected in the optical film inspection step is not detected in the optical display device inspection step.

According to the present invention, an optical display device manufacturing method producing the same effects as the optical display device manufacturing system according to the fourth aspect of the present invention can be provided.

An optical display device manufacturing method according to a tenth aspect of the present invention relates to the optical display device manufacturing method, wherein the detection condition is prescribed by brightness difference between the defect in the optical film and a periphery of the defect, and a size of the defect.

According to the present invention, an optical display device manufacturing method producing the same effects as the optical display device manufacturing system according to the fifth aspect of the present invention can be provided.

BRIEF DESCRIPTION OF THE DRAWINGS

FIG. 5 is a view for explaining a change in a pre-bonding detection condition range before and after the correction by a detection condition correcting portion.

MODES FOR CARRYING OUT THE INVENTION

First Embodiment

Figure 1:
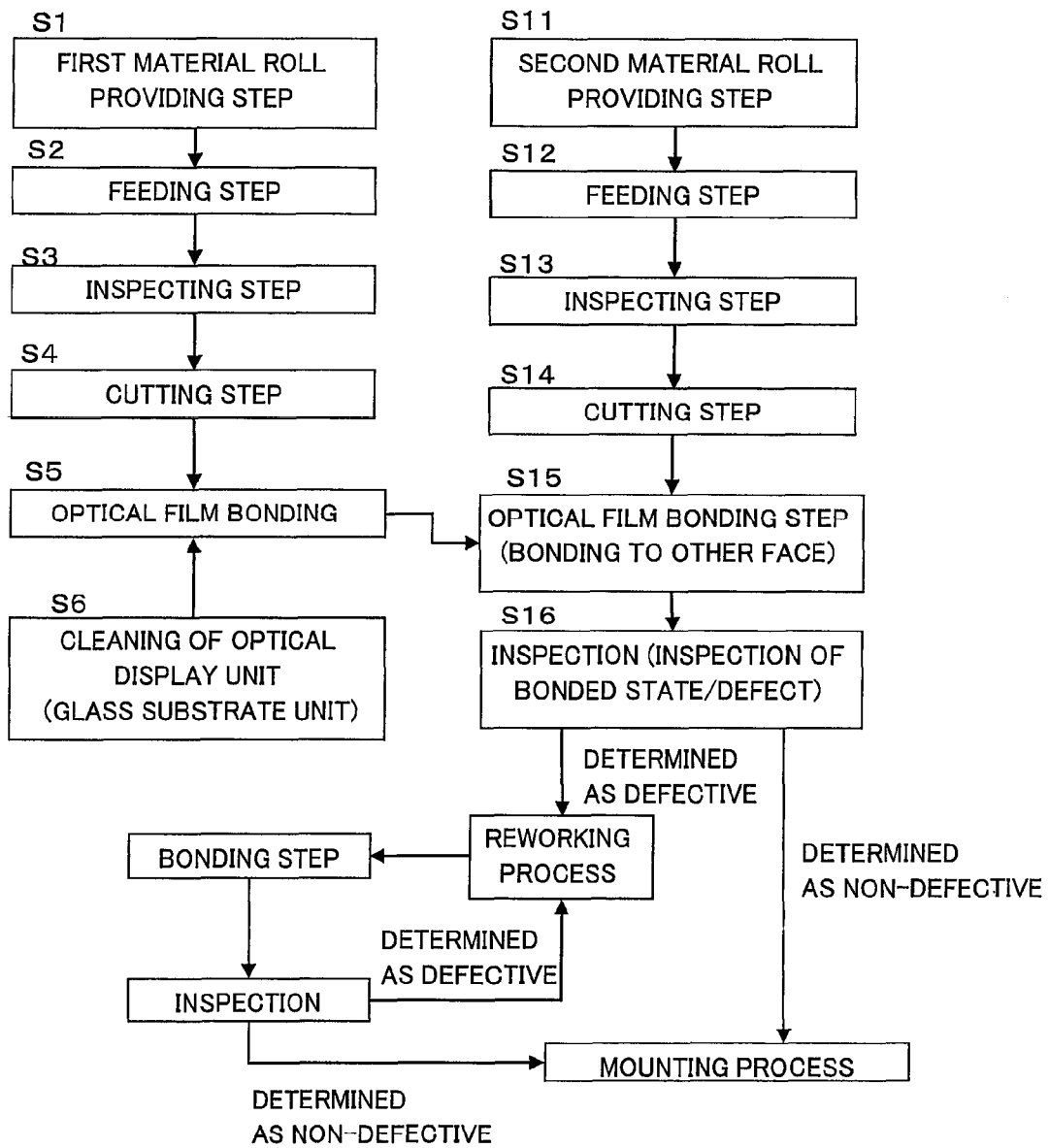
FIG. 1 is a flow chart of a manufacturing method of an optical display device according to a first embodiment.

A description will be given below of a first embodiment in accordance with the present invention. FIG. 1 shows a flow chart of a production method of an optical display device in accordance with the first embodiment. A production system in accordance with the first embodiment corresponds to a construction example which is not provided with first and second pre-inspection peeling apparatuses, and first and second release film laminating apparatuses in a structure of a production system in accordance with a second embodiment mentioned below. Further, a construction which is not provided with first and second defect inspection apparatuses, can be exemplified as the other embodiment of the production system in accordance with the first embodiment.

(Optical Display Unit)

First, for example, a glass substrate unit of a liquid crystal cell, an organic electroluminescent (EL) light-emitting unit and the like can be listed up, as an optical display unit used in the present invention.

(Optical Film)

A polarizer film, a retardation film, a viewing angle compensating film, a brightness enhancement film, a laminated film configured by a combination of two or more these films can be exemplified as an optical film bonded to the optical display unit. There is a case that a transparent film for protecting is laminated to a front face of the optical film. Further, a pressure-sensitive adhesive layer is formed on one front face of the optical film, in such a manner as to be bonded to the optical display unit, and a release film for protecting the pressure-sensitive adhesive layer is provided thereon. Further, a surface protecting film is provided on the other surface of the optical film via the pressure-sensitive adhesive layer. A specific structure of these films will be mentioned below. In the following description, the optical film to which the surface protecting film and the release film are laminated may be called as a sheet material.

(Production Flow Chart)

Figure 3:
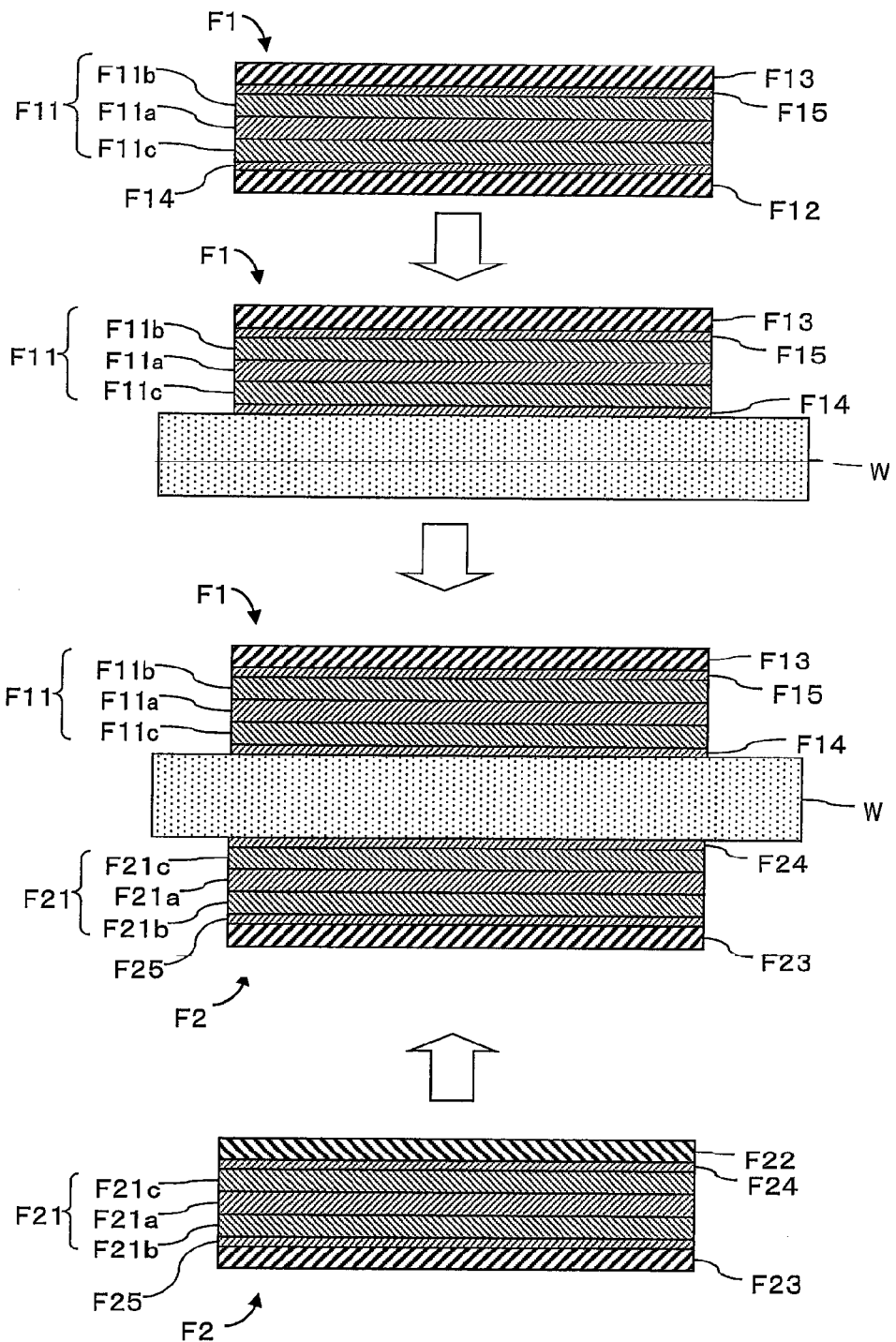
FIG. 3 is a view for explaining one example of a lamination structure of first and second optical films.

(1) First Material Roll Providing Step (S1 in FIG. 1). A long first sheet material is provided as a first material roll. A width of the first material roll depends on a bonding size of the optical display unit. As shown in FIG. 3, a lamination structure of a first sheet material F1 has a first optical film F11, a first release film F12 and a surface protecting film F13. The first optical film F11 is configured by a first polarizer F11a, a first film F11b provided on one face via an adhesive layer (not shown), and a second film F11c provided on the other face via the adhesive layer (not shown).

The first and second films F11b and F11c are configured, for example, by a polarizer protecting film (for example, a tri-acetyl cellulose film, a PET film or the like). The second film F11c is bonded to the optical display unit face side via a first pressure-sensitive adhesive layer F14. A surface treatment can be applied to the first film F11b. As the surface treatment, for example, there can be listed up a hard coating, an anti-reflection treatment, a treatment aiming at a prevention of a sticking, a diffusion and an anti-glare, and the like. The first release film F12 is provided via the second film F11c and the first pressure-sensitive adhesive layer F14. Further, the surface protecting film F13 is provided via the first film F11b and the pressure-sensitive adhesive layer F15. In the following description, there is a case that the laminated structure of the polarizer and the polarizer protecting film is called as the polarizing plate.

Each of the following steps is carried out within an isolating construction which is isolated in a factory, and a cleanliness factor is maintained. It is particularly preferable that the cleanliness factor is maintained in a bonding step bonding the optical film to the optical display unit.

(2) Feeding Step (S2 in FIG. 1). The first sheet material F1 is unwound from the provided and placed first material roll, and is fed to a downstream side.

(3) First Inspection Step (S3 in FIG. 1: Optical Film Inspection Step). A defect of the first sheet material F1 is inspected by using a first defect inspection apparatus. As a defect inspection method in this case, there can be listed up a method of performing imaging and image processing generated by a transmitted light and a reflected light with respect to both faces of the first sheet material F1, a method of performing imaging and image processing by arranging a polarization film for inspection between a CCD camera and a subject to be inspected, in such a manner as to form crossed nicols relation (which may be called as 0 degree cross) to a polarization axis of the polarization plate corresponding to the subject to be inspected, and a method of performing imaging and image processing by arranging a polarization film for inspection between a CCD camera and a subject to be inspected, in such a manner as to form a predetermined angle (for example, in a range larger than 0 degree and less than 10 degree) (which may be called as x degree cross) to a polarization axis of the polarization plate corresponding to the subject to be inspected. In this case, a known method can be applied to an algorithm of the image processing, for example, the defect can be detected by grayscale determination in accordance with a binarization processing.

In the performing imaging and image processing method by the transmitted light, it is possible to detect a contaminant in an inner portion of the first sheet material F1. In the performing imaging and image processing method by the reflected light, it is possible to detect a contaminant attached to the front face of the first sheet material F1. In the performing imaging and image processing method by the 0 degree cross, it is possible to mainly detect a contaminant on the front face, a dirty, a contaminant in an inner portion and the like as a bright spot. In the performing imaging and image processing method by the x degree cross, it is possible to mainly detect a knick.

The information of the defect obtained by the first defect inspection apparatus is associated with its positional information (for example, a position coordinate), is transmitted to a controller, and can contribute to a cutting method by a first cutting apparatus mentioned below.

(4) First Cutting Step (S4 in FIG. 1). The first cutting apparatus cuts the surface protection film F13, the pressure-sensitive adhesive layer F15, the first optical film F11 and the first pressure-sensitive adhesive layer F14 to a predetermined size without cutting the first release film F12. As the cutting portion, for example, there can be listed up a laser, a cutter, and the other known cutting portion. The structure is made such as to cut while avoiding the defect in such a manner that the defect is not included in the region bonded to the optical display unit W, based on the information of the defect obtained by the first defect inspection apparatus. Accordingly, the yield ratio of the first sheet material F1 is greatly improved. As mentioned above, the method of cutting while avoiding the defect in such a manner that the defect is not included in the region bonded to the optical display unit W is called a skip cut, however, the defect information at a time of cutting may be obtained by an inline defect inspection apparatus or may be previously attached to the material roll. The first sheet material F1 including the defect is excluded by a first rejection apparatus mentioned below, and is structured such that it is not bonded to the optical display unit W.

(5) First Optical Film Bonding Step (S5 in FIG. 1). The first optical film F11 from which the first release film F12 is removed is bonded to the optical display unit W via the first pressure-sensitive adhesive layer F by using a first bonding apparatus while removing the first release film F12 by using the first peeling apparatus. At a time of the bonding, the first optical film F11 and the optical display unit W are pinched by roll pairs so as to be crimped, as mentioned below.

(6) Cleaning Step (S6 in FIG. 1). The optical display unit W is cleaned its front face in accordance with a polishing cleaning, a water cleaning or the like. The cleaned optical display unit W is fed to the first bonding apparatus.

It is preferable that the first material roll providing step, the first inspecting step, the first cutting step, the first optical film bonding step and the cleaning step are set to a continuous production line. The first optical film F11 is bonded to one face of the optical display unit W through a series of production steps mentioned above. In the following description, a description will be given below of a production steps bonding the second optical film F21 to the other face.

(7) Second Material Roll Providing Step (S11 in FIG. 1). The long second sheet material F2 is provided as the second material roll. As shown in FIG. 3, a laminated structure of the second sheet material F2 is the same structure as the first sheet material, however, is not limited to this. The second sheet material F2 has the second optical film F21, a second release film F22, and a surface protecting film F23. The second optical film F21 is configured by a second polarizer 21a, a third film F21b provided on one face thereof via an adhesive layer (not shown), and a fourth film F21c provided on the other face thereof via an adhesive layer (not shown).

The third and fourth films F21b and F21c are configured, for example, by a polarizer protecting film (for example, a tri-acetyl cellulose film, a PET film or the like). The fourth film F21c is bonded to the optical display unit face side via a second pressure-sensitive adhesive layer F24. A surface treatment can be applied to the third film F21b. As the surface treatment, for example, there can be listed up a hard coat treatment, a reflection preventing treatment, a treatment aiming at a prevention of a sticking, a diffusion and an anti-glare, and the like. The second release film F22 is provided via the fourth film F21c and the second pressure-sensitive adhesive layer F24. Further, the surface protecting film F23 is provided via the third film F21b and the pressure-sensitive adhesive layer F25.

(8) Feeding Step (S12 in FIG. 1). The second sheet material F2 is unwound from the provided and placed second material roll, and is fed to a downstream side.

(9) Second Inspecting Step (S13 in FIG. 1: Optical Film Inspection Step). A defect of the second sheet material F2 is inspected by using a second defect inspection apparatus. The defect inspecting method in this case is the same as the method by the first defect inspection apparatus mentioned above.

(10) Second Cutting Step (S14 in FIG. 1). A second cutting apparatus cuts the surface protecting film F23, the pressure-sensitive adhesive layer F25, the second optical film F21 and the second pressure-sensitive adhesive layer F24 into a predetermined size without cutting the second release film F22. As the cutting portion, for example, there can be listed up a laser, a cutter, the other known cutting portion and the like. The structure is made such as to cut while avoiding the defect in such a manner that the defect is not included in the region bonded to the optical display unit W, based on the information of the defect obtained by the second defect inspection apparatus. Accordingly, the yield ratio of the second sheet material F2 is greatly improved. The second sheet material F2 including the defect is excluded by a second rejection apparatus mentioned below, and is structured such that it is not bonded to the optical display unit W.

(11) Second Optical Film Bonding Step (S15 in FIG. 1). Next, after the second cutting step, the second optical film F21 from which the second release film F22 is removed is bonded to a different face from the face to which the first optical film F11 of the optical display unit W is bonded, via the second pressure-sensitive adhesive layer F24 by using a second bonding apparatus while removing the second release film F22 by using the second peeling apparatus. In this case, there is a case that the optical display unit W is rotated at 90 degree by a feed direction switching mechanism of a feed mechanism before bonding the second optical film F21 to the optical display unit W, thereby making the first optical film F11 and the second optical film F21 in a relation of crossed nicols. At a time of the bonding, the second optical film F21 and the optical display unit W are pinched by rolls so as to be crimped, as mentioned below.

(12) Inspecting Step of Optical Display Device (S16 in FIG. 1: Optical Display Device Inspecting Step). The inspecting apparatus detects the optical display device in which the optical film is bonded to both the faces of the optical display unit W. As an inspecting method, there can be exemplified a method of performing imaging and image processing by the reflected light with respect to both the faces of the optical display device. Further, as the other method, there can be listed up a method of using the polarization film for inspecting placed between the CCD camera and the subject to be inspected. In this case, a known method can be applied to an algorithm of the image processing, and it is possible to detect the defect, for example, by grayscale determination in accordance with a binarization processing.

(13) A non-defective of the optical display device is determined based on the information of the defect obtained by the inspecting apparatus. The optical display device determined as the non-defective is fed to the next mounting process. In the case that a defective is determined, a reworking process is applied, and the optical film is bonded newly, and is next inspected. In the case that the non-defective is determined, the process gives way to the mounting process, and in the case that the defective is determined, the process again gives way to the reworking process or the defective is put on the shelf.

In a series of production steps mentioned above, it is possible to suitably produce the optical display device by setting the bonding step of the first optical film F11 and the bonding step of the second optical film F21 to the continuous production line.

(Other Embodiment of Skip Cut)

Further, a description will be given below of the other embodiment of the first cutting step and the second cutting step mentioned above. There is a case that the defect information (the defect coordinate, the kind of the defect, the size or the like) of the first and second sheet materials is attached as a code information (for example, a QR code and a bar code) to one end portion in a width direction of the first and second material rolls at a predetermined pitch unit (for example, 1000 mm). In the case mentioned above, the step reads the cord information in a preliminary stage of the cutting, and cuts into a predetermined size in the first and second cutting steps in such a manner as to avoid the defect portion based on the analysis. Further, the portion including the defect is structured such as to be removed or be bonded to the other member than the optical display unit, and the piece of sheet material which is cut into the predetermined size and is determined as the non-defective is structured such as to be bonded to the optical display unit. Accordingly, a yield of the optical films F11 and F21 is widely improved.

Second Embodiment

Figure 2:
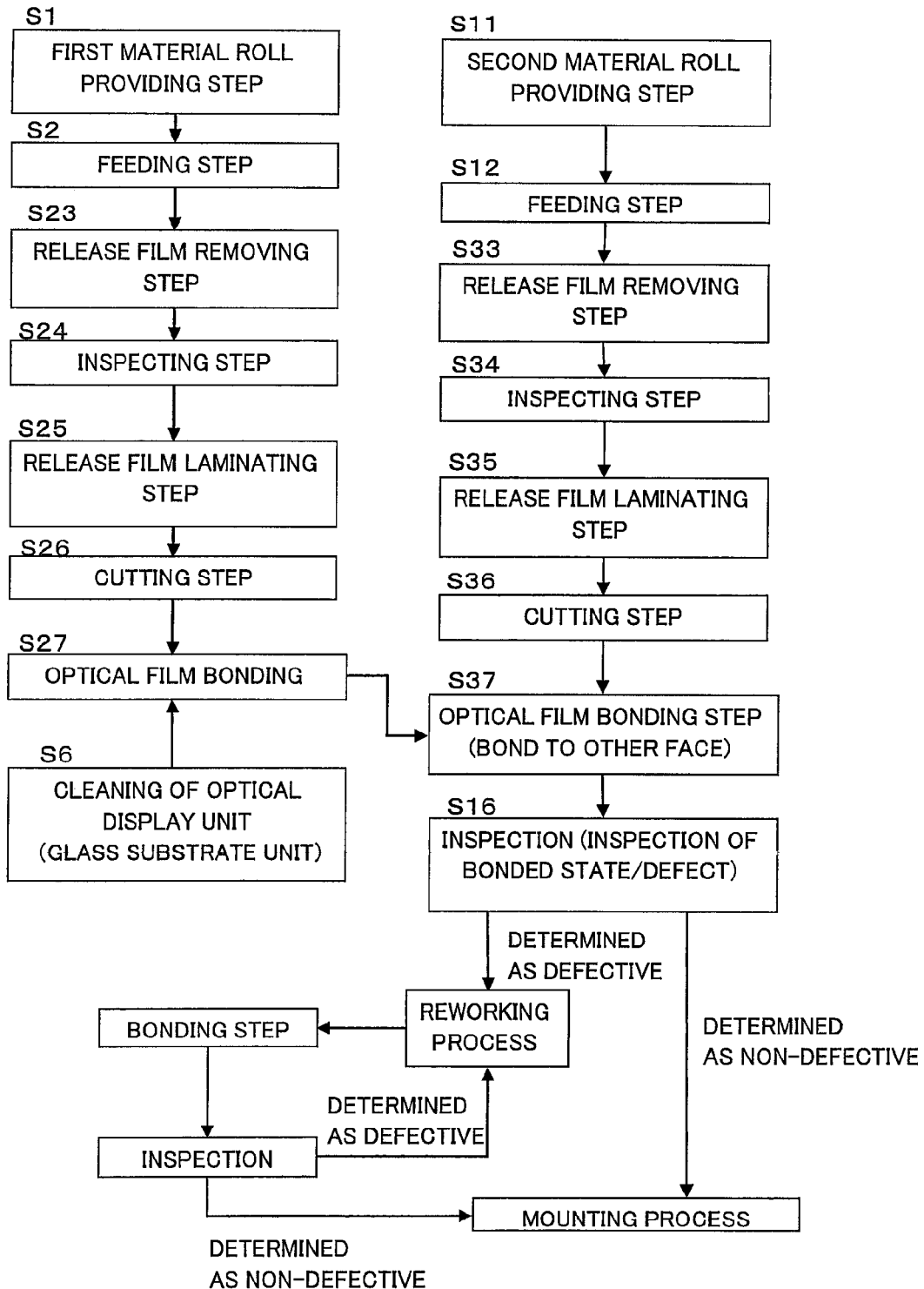
FIG. 2 is a flow chart of a manufacturing method of an optical display device according to a second embodiment.

A description will be given below of the second embodiment in accordance with the present invention. FIG. 2 shows a flow chart of a production method of an optical display device in accordance with the second embodiment. The same steps as those of the first embodiment will be described briefly.

(1) First Material Roll Providing Step (S1 in FIG. 2). A long first sheet material F1 is provided as a first material roll. A lamination structure of a first sheet material F1 is the same as that of the first embodiment shown in FIG. 3.

(2) Feeding Step (S2 in FIG. 2). The first sheet material F1 is unwound from the provided and placed first material roll, and is fed to a downstream side.

(3) Release Film Removing Step (S23 in FIG. 2). A first pre-inspection peeling apparatus peels off the first release film F12 from the fed first sheet material F1. Details of the peeling mechanism will be mentioned below.

(4) First Inspecting Step (S24 in FIG. 2: Optical Film Inspecting Step). The first inspecting apparatus inspects the defect of the first sheet material F1 after the release film removing step. The defect inspection of the first optical film F11 can be carried out without necessity for taking into consideration a retardation which is underlying in the release film F12. A method of inspecting the defect is as mentioned above. The first sheet material F1 including the defect is excluded by a first rejection apparatus mentioned below, and is structured such as not to be attached to the optical display unit W.

(5) Release Film Laminating Step (S25 in FIG. 2). A first release film laminating apparatus laminates the first release film F12 to the first optical film F11 via the first pressure-sensitive adhesive layer F14 after the first inspecting step. It is preferable for maintaining a distortion of track to carry out the lamination in such a manner as to prevent a foam entrapment such as an air bubble at a time of laminating. Details of the first release film laminating apparatus will be mentioned below.

(6) First Cutting Step (S26 in FIG. 2). Next, a first cutting apparatus cuts the surface protecting film F13, the pressure-sensitive adhesive layer F15, the first optical film F11 and the first pressure-sensitive adhesive layer F14 into a predetermine size without cutting the first release film F12 after the release film laminating step. As the cutting portion, for example, there can be listed up a laser, a cutter, the other known cutting portion and the like.

(7) First Optical Film Bonding Step (S27 in FIG. 2). Next, a first peeling apparatus peels off the first release film F12 after the first cutting step. The first bonding apparatus bonds the first optical film F11 from which the first release film F12 is peeled off to the optical display unit W via the first pressure-sensitive adhesive layer F14. At a time of bonding, the first optical film F11 and the optical display unit W are pinched by rolls so as to be crimped, as mentioned below.

(8) Cleaning Step of Optical Display Unit (S6 in FIG. 2). This is the same step as mentioned above.

(9) Second Material Roll Providing Step (S11 in FIG. 2). The long second sheet material F2 is provided as a second material roll. A laminated structure of the second sheet material F2 is a structure shown in FIG. 3.

(10) Feeding Step (S12 in FIG. 2). The second sheet material F2 is unwound from the provided and placed second material roll, and is fed to a downstream side.

(11) Release Film Removing Step (S33 in FIG. 2). A second pre-inspection peeling apparatus peels off the second release film F22 from the fed second sheet material F2. Details of the peeling mechanism will be mentioned below.

(12) Second Inspecting Step (S34 in FIG. 2: Optical Film Inspecting Step). A second inspecting apparatus inspects a defect of the second sheet material F2 after the release film removing step. It is possible to carry out a defect inspection of the second optical film F21 without necessity for taking into consideration a retardation which is underlying in the release film F22. A method of inspecting the defect is as mentioned above. The second sheet material F2 including the defect is excluded by a second rejection apparatus mentioned below, and is structured such as not to be laminated to the optical display unit.

(13) Release Film Laminating Step (S35 in FIG. 2). A second release film laminating apparatus laminates the second release film F22 to the second optical film F21 via the second pressure-sensitive adhesive layer F24 after the second inspecting step. It is preferable for maintaining a distortion of track to carry out the lamination in such a manner as to prevent a foam entrapment such as an air bubble at a time of laminating. Details of the second release film laminating apparatus will be mentioned below.

(14) Second Cutting Step (S36 in FIG. 2). Next, a second cutting apparatus cuts the surface protecting film F23, the pressure-sensitive adhesive layer F25, the second optical film F21 and the second pressure-sensitive adhesive layer F24 into a predetermine size without cutting the second release film F22 after the release film laminating step. As the cutting portion, for example, there can be listed up a laser, a cutter, the other known cutting portion and the like.

(15) Second Optical Film Bonding Step (S37 in FIG. 2). Next, a second peeling apparatus peels off the second release film F22 after the second cutting step. The second bonding apparatus bonds the second optical film F21 from which the second release film F22 is peeled off to a different face from the face to which the first optical film F11 of the optical display unit W is bonded, via the second pressure-sensitive adhesive layer F24. In this case, there is a case that the first optical film F11 and the second optical film F21 are set to crossed nicols relation by rotating the optical display unit W at 90 degree, before bonding the second optical film F21 to the optical display unit W. At a time of bonding, the second optical film F21 and the optical display unit W are pinched by rolls so as to be crimped, as mentioned below. In accordance with the above steps, the first optical film F11 is bonded to one face of the optical display unit W, and the second optical film F21 is bonded to the other face, so that it is possible to product the optical display device in which the optical films are provided in both faces.

(16) Inspecting Step of Optical Display Device (S16 in FIG. 2: Optical Display Device Inspecting Step). This step is the same as mentioned above.

(17) The optical display device is determined whether or not it is a non-defective, based on the information of the defect obtained by the inspecting apparatus. The optical display device determined as the non-defective is fed to the next mounting process. In the case that the defective is determined, the reworking process is applied, the optical film is newly attached, and the inspection is carried out. In the case that a non-defective is determined, the process gives way to the mounting process, and in the case that a defective is determined, the process again gives way to the reworking process or the defective is put on the shelf.

In a series of production steps mentioned above, it is possible to suitably produce the optical display device by executing the bonding step of the first optical film F11 and the bonding step of the second optical film F21 in the continuous production line. Particularly, it is possible to bond the optical film to the optical display unit under an environment in which a cleanliness factor is secured, by carrying out each of the processed in an inner portion of an isolating construction which is isolated from the factory, whereby it is possible to produce the optical display device having a high quality.

(Preferable Production System Achieving Production Methods of First and Second Embodiments)

A description will be given below of an example of a preferable production system which achieves the production method in accordance with the second embodiment.

Various apparatuses achieving the production method in accordance with the second embodiment are isolated from an external portion by the isolating construction. An internal portion surrounded by the isolating construction is kept clean in comparison with the external portion. The isolating construction is configured by a transparent material wall and a frame construction. A blower apparatus is installed in a ceiling of the isolating construction. The blower apparatus is provided with a HEPA filter, and sends air having a high cleanliness factor to the internal portion of the partition wall construction. A lower portion of a wall surface of the partition wall construction is provided with an air discharge opening portion for discharging the internal air to the external portion. Further, a filter may be provided in an opening surface for preventing an intruding material from the external portion. It is possible to maintain a whole of the production system in a clean environment by the partition wall construction and the blower apparatus, and it is possible to preferably prevent the contaminant from being mixed from the external portion. Further, since only the production system is isolated from the external portion by the partition wall construction, it is not necessary to set a whole of factory to a so-called clean room.

First, a description will be given of a polishing cleaning apparatus. The optical display unit W is taken out from the storage box, and is mounted to the feeding mechanism. If the optical display unit W reaches a cleaning position, the feed is stopped, and an end portion of the optical display unit W is held by a holding portion. A grinding portion is brought into contact with a top face of the optical display unit W from the vertical above, and the grinding portion is brought into contact with a lower face of the optical display unit from the vertical below. The grinding portions are rotated on both the surfaces of the optical display unit W. Accordingly, the attached contaminants on both the surfaces of the optical display unit W are removed. As the attached contaminant, for example, a micro piece of a glass, a fiber piece and the like are exemplified.

Next, a description will be given of a water cleaning apparatus. The grind cleaned optical display unit W is fed to a water bath by the feeding mechanism, and is water cleaned here. A pure water flows in an inner portion of the water bath. Both faces of the optical display unit W fed from the water bath are cleaned by the pure water flown out of a flowing water pipe. Next, the optical display unit W is drained by a ventilation of the clean air by means of a drying apparatus. Next, the optical display unit W is fed to the first bonding apparatus. In this case, as the other embodiment, it is possible to clean by using an ethanol water solution in place of the pure water. Further, as the other embodiment, it is possible to omit the water bath.

Next, a description will be given below of the various apparatuses. The first material roll of the long first sheet material F1 is installed to a roll mount apparatus working with a motor or the like in such a manner as to rotate free or rotate at a fixed rotating speed. The rotating speed is set by a controller and is drive-controlled.

The first feeder is a feeding mechanism feeding the first sheet material F1 to a downward side. The first feeder is provided with a lot of feed rollers, and the first sheet material F1 is fed along a feed path formed by the feed rollers. The feed path extends from the first material roll to the first bonding apparatus. The first feeder is controlled by the controller.

The first pre-inspection peeling apparatus is structured such as to peel off the first release film F12 from the first sheet material F1 fed along the feed path, and wind around the roll. The winding speed around the roll is controlled by the controller. The peeling mechanism is structured such as to peel off the first release film F12 by reverse transferring the first release film F12, and feed the first sheet material F1 after peeling off the first release film F12 in the feeding direction.

The first inspecting apparatus inspects the defect after peeling off the first release film F12. The first inspecting apparatus analyzes an image data photographed by a CCD camera so as to detect the defect, and calculates a position coordinate thereof. The position coordinate of this defect is provided for the skip cut by the first cutting apparatus mentioned below.

The first release film laminating apparatus laminates the first release film F12 to the first optical film F11 via the first pressure-sensitive adhesive layer F14 after the first defect inspection. The first release film F12 is unwound from the material roll of the first release film F12, and the first release film F12 and the first optical film F11 are pinched by one or a plurality of roller pairs, and are laminated by applying a predetermined pressure by means of the roller pairs. A rotating speed, a pressure and a feeding of the roller pairs are controlled by the controller.

The first cutting apparatus cuts the first optical film F11, the surface protecting film F13, the first pressure-sensitive adhesive layer F14 and the pressure-sensitive adhesive layer F15 into a predetermined size without cutting the first release film F12. The first cutting apparatus is constituted, for example, by a laser. Based on the position coordinate of the defect detected by the first defect inspection process, the first cutting apparatus cuts into the predetermined size while avoiding the defect portion, in such a manner that the defect is not included in the region bonded to the optical display unit W. In other words, the cut article including the defect portion is excluded as the defective by the first rejection apparatus in the later step. Alternatively, the first cutting apparatus may continuously cut into the predetermined size without respect to the existence of the defect. In this case, the structure may be made such as to remove the portion without bonding, in a bonding step mentioned below. The control in this case is based on the function of the controller.

Further, the first cutting apparatus arranges a holding table adsorbing and holding the first sheet material F1 from a rear face, and is provided with the laser above the first sheet material F1. It horizontally moves in such a manner as to scan the laser in a width direction of the first sheet material F1, and cuts the first optical film F11, the first pressure-sensitive adhesive layer F14, the surface protecting film F13 and the pressure-sensitive adhesive layer F15 at a predetermined pitch in a feeding direction thereof while leaving the first release film F12 in the lowest portion (hereinafter, refer optionally to as "half cut"). Further, it is preferable that the laser is integrally configured by an air nozzle spraying a warm air toward the cut position, and a smoke collecting duct collecting a gas (a smoke) generated from the cut position fed by the warm air, in a state in which they oppose to each other, in such a manner as to pinch from the width direction of the first sheet material F1. In the case of adsorbing the first sheet material F1 by the holding table, an accumulator of the feeding mechanism is structured such as to move up and down in a vertical direction, so as not to stop the continuous feed of the first sheet material F1 in a downstream side and an upstream side. This motion is based on the control of the controller.

The first bonding apparatus bonds the first sheet material F1 (the first optical film F11) from which the first release film F12 is peeled off by the first peeling apparatus to the optical display unit W via the first pressure-sensitive adhesive layer F14, after the cutting step mentioned above. The feed path of the first sheet material F1 is above the feed path of the optical display unit W. The flow of the clean air from the blower apparatus is blocked by the first sheet material F1, and a wind force becomes weak in the top face of the optical display unit W.

In the case of bonding, the first optical film F11 is bonded to the optical display unit W surface while pressure welding by a pressing roller and a guide roller. A pressing pressure and a driving motion of the pressing roller and the guide roller are controlled by the controller.

The peeling mechanism of the first peeling apparatus is structured such as to peel off the first release film F12 by reverse transferring the first release film F12, and feed the first sheet material F1 (the first optical film F11) after peeling off the first release film F12 to the optical display unit W surface. At this time, it is possible to improve a bonding precision of the first optical film by carrying out a state in which a tensile force which is equal to or more than 150 N/m and equal to or less than 1000 N/m is applied to the first release film F12 and/or a time until the first optical film is pressure contacted with the optical display unit W surface after the first release film F12 is peeled off, within three seconds. If the tensile force is smaller than 150 N/m, a feeding position of the first optical film is not stable, and if it is larger than 1000 N/m, there is a risk that the first release film F12 extends so as to be broken. If the time till the pressure contact is longer than three seconds, there is a risk that the first optical film peeled off from the first release film F12 is curved and a bending or an air bubble is generated. The peeled first release film F12 is wound around the roll. A winding control of the roll is controlled by the controller.

The bonding mechanism is configured by the pressing roller and the guide roller arranged so as to oppose thereto. The guide roller is configured by a rubber roller which is rotationally driven by a motor, and is arranged so as to be movable up and down. Further, the pressing roller configured by a metal roller which is rotationally driven by a motor is arranged just above the same so as to be movable up and down. The pressing roller is structured such as to be moved up to a higher position than a top face thereof so as to form a roller interval at a time of feeding the optical display unit W to the bonding position. In this case, each of the guide roller and the pressing roller may be configured by the rubber roller or the metal roller. The optical display unit W is cleaned by the various cleaning apparatuses as mentioned above, and is structured such as to be fed by the feeding mechanism. The feed control of the feeding mechanism is also controlled by the controller.

A description will be given of the first rejection apparatus excluding the first sheet material F1 including the defect. If the first sheet material F1 including the defect is fed to the bonding position, the guide roller moves downward vertically. Next, the roller around which the remover film is wound moves to a fixed position of the guide roller. The first sheet material F1 is bonded to the remover film by moving the press roller downward vertically so as to press the first sheet material F1 including the defect to the remover film, and the first sheet material F1 including the defect is wound around the roller together with the remover film. The remover film can bond the first sheet material F1 including the defect by utilizing the adhesive power of the first pressure-sensitive adhesive layer F14 of the first sheet material F1, however, a pressure sensitive adhesive tape can be used as the remover film.

The optical display unit W to which the first optical film F11 is bonded as mentioned above is fed to a downward side, and the second optical film F21 (the second sheet material F2) is bonded thereto. In the following description, a similar apparatus structure will be briefly described.

In the case that the second optical film F21 is bonded to the first optical film F11 in a relation of 90 degree (a relation of crossed nicols), the second optical film F21 is bonded after rotating the optical display unit W at 90 degree by a feed direction switching mechanism of the feeding mechanism. In the bonding method of the second sheet material F2 described below, the structure is made such as to process each of the steps in a state in which the second sheet material F2 is reversed (in such a manner that the second release film F22 comes to a top face), and bond the second optical film F21 from a lower side of the optical display unit W.

The second material roll of the long second sheet material F2 is installed to the roll mount apparatus working with the motor or the like in such a manner as to rotate free or rotate at a fixed rotating speed. The rotating speed is set by the controller, and is drive-controlled.

The second feeder is a feeding mechanism feeding the second sheet material F2 to a downward side. The second feeder is provided with a lot of feed rollers, and the second sheet material F2 is fed along a feed path formed by these feed rollers. The feed path extends from the second material roll to the second bonding apparatus. The second feeder is controlled by the controller.

The second pre-inspection peeling apparatus is structured such as to peel off the second release film F22 from the second sheet material F2 fed along the feed path so as to wind around the roll. A winding speed around the roll is controlled by the controller. The peeling mechanism is structured such as to peel off the second release film F22 by reverse transferring the second release film F22, and feed the second sheet material F2 after peeling off the second release film F22 in the feeding direction.

The second inspecting apparatus inspects the defect after peeling off the second release film F22. The second inspecting apparatus analyzes the image data photographed by the CCD camera so as to detect the defect, and calculates a position coordinate thereof. The position coordinate of this defect is provided for the skip cut by the second cutting apparatus mentioned below.

The second release film laminating apparatus laminates the second release film F22 to the second optical film F21 via the second pressure-sensitive adhesive layer F24 after the second defect inspection. The second release film F22 is unwound from the material roll of the second release film F22, and the second release film F22 and the second optical film F21 are pinched by one or a plurality of roller pairs, and are laminated by applying a predetermined pressure by means of the roller pairs. A rotating speed, a pressure and a feeding of the roller pairs are controlled by the controller.

The second cutting apparatus cuts the second optical film F21, the surface protecting film F23, the second pressure-sensitive adhesive layer F24 and the pressure-sensitive adhesive layer F25 into a predetermined size without cutting the second release film F22. The second cutting apparatus is constituted, for example, by a laser. Based on the position coordinate of the defect detected by the second defect inspection process, the second cutting apparatus cuts into the predetermined size while avoiding the defect portion, in such a manner that the defect is not included in the region bonded to the optical display unit W. In other words, the cut article including the defect portion is excluded as the defective by the second rejection apparatus in the later step. Alternatively, the second cutting apparatus may continuously cut into the predetermined size without respect to the existence of the defect. In this case, the structure may be made such as to remove the portion without bonding, in a bonding step mentioned below. The control in this case is based on the function of the controller.

Further, the second cutting apparatus arranges a holding table adsorbing and holding the second sheet material F2 from a rear face, and is provided with the laser below the second sheet material F2. It horizontally moves in such a manner as to scan the laser in a width direction of the second sheet material F2, and cuts the second optical film F21, the second pressure-sensitive adhesive layer F24, the surface protecting film F23 and the pressure-sensitive adhesive layer F25 at a predetermined pitch in a feeding direction thereof while leaving the second release film F22 in the lowest portion. In the case of adsorbing the second sheet material F2 by the holding table, an accumulator of the feeding mechanism is structured such as to move up and down in a vertical direction, so as not to stop the continuous feed of the second sheet material F2 in a downstream side and an upstream side. This motion is based on the control of the controller.

The second bonding apparatus bonds the second sheet material F2 (the second optical film F21) from which the second release film F22 is peeled off by the second peeling apparatus to the optical display unit W via the second pressure-sensitive adhesive layer F24, after the cutting step. In the case of bonding, the second optical film F21 is bonded to the optical display unit W surface while pressure welding by a pressing roller and a guide roller. A pressing pressure and a driving motion of the pressing roller and the guide roller are controlled by the controller.

The peeling mechanism of the second peeling apparatus is structured such as to peel off the second release film F22 by reverse transferring the second release film F22, and feed the second sheet material F2 (the second optical film) after peeling off the second release film F22 to the optical display unit W surface. At this time, it is possible to improve a bonding precision of the second optical film by carrying out a state in which a tensile force which is equal to or more than 150 N/m and equal to or less than 1000 N/m is applied to the second release film F22 and/or a time until the second optical film is pressure contacted with the optical display unit W surface after the second release film F22 is peeled off, within three seconds. If the tensile force is smaller than 150 N/m, a feeding position of the second optical film is not stable, and if it is larger than 1000 N/m, there is a risk that the second release film F22 extends so as to be broken. If the time till the pressure contact is longer than three seconds, there is a risk that the first optical film peeled off from the second release film F22 is curved and a bending or an air bubble is generated. The peeled second release film F22 is wound around the roll. A winding control of the roll is controlled by the controller.

The bonding mechanism is configured by the pressing roller and the guide roller arranged so as to oppose thereto. The guide roller is configured by a rubber roller which is rotationally driven by a motor, and is arranged so as to be movable up and down. Further, the pressing roller configured by a metal roller which is rotationally driven by a motor is arranged just below the same so as to be movable up and down. The pressing roller is structured such as to be moved down to a below position so as to form a roller interval at a time of feeding the optical display unit W to the bonding position. In this case, each of the guide roller and the pressing roller may be configured by the rubber roller or the metal roller.

A description will be given of the second rejection apparatus excluding the second sheet material F2 including the defect. If the second sheet material F2 including the defect is fed to the bonding position, the guide roller moves upward vertically. Next, the roller around which the remover film is wound moves to a fixed position of the guide roller. The second sheet material F2 including the defect is pressed to the remover film by moving the pressing roller upward vertically, the second sheet material F2 is bonded to the remover film, and the second sheet material-F2 including the defect is wound around the roller together with the remover film.

The optical display device formed by bonding the first and second sheet materials to the optical display unit W is fed to the inspecting apparatus. The inspecting apparatus executes the inspection with respect to both faces of the fed optical display device. The light source emits light vertically to the top face of the optical display device by a half mirror, and a reflected light image is photographed as an image data by a CCD camera. Further, the other light source emits light to the front face of the optical display device at a predetermined angle, and a reflected light image is photographed as an image data by the CCD camera. The inspection of the opposite surface of the optical display device is executed in the same manner by using the light source and the CCD camera. The defect is image processed and analyzed from the image data, and a non-defective is determined.

An operation timing of each of the apparatuses is calculated, for example, by a method that a sensor is arranged at a predetermined position so as to detect, or is calculated in such a manner as to detect a rotating member of the feeder and the feeding mechanism by a rotary encoder or the like. The controller may be achieved by a cooperating action between a software program and a hardware resource such as a CPU, a memory or the like. In this case, the program software, a processing procedure, various settings and the like are previously stored in the memory. Further, it can be configured by a dedicated circuit, a firmware or the like.

In the production system mentioned above, the structure is made such as to bond the first sheet material F1 (the first optical film F11) from the top face of the optical display unit W, and bond the second sheet material F2 (the second optical film F21) from the lower face of the optical display unit W.

The wind force just below the blower apparatus becomes large, and the wind force becomes weaker toward a bottom of the partition wall structure. This is because the various apparatus members, the first sheet material F1, the optical display unit W and the remover film stands in the way of the flow of the clean air. Particularly, the flow of the clean air is weak in the back side of the first sheet material F1, and there is a case that a retention of the clean air is generated in the top face side of the optical display unit W. There is thought that the weaker the flow of the clean air is, the lower the cleanliness factor is. Since the dust and the contaminant are accumulated if the cleanliness factor is low, the contaminant is attached to the top face of the optical display unit W, and there is thought that this is not preferable.

(Production System in Accordance with Other Embodiment)

Accordingly, a description will be given below of a production system which can suppress the retention of the clean air, and can bond the first optical film F11 to the optical display unit W in a state in which the cleanliness factor is maintained high.

The first sheet material F1 is fed in a state in which the first release film F12 is set to the top face. The structures and the functions of the first pre-inspection peeling apparatus, the first inspecting apparatus, and first release film laminating apparatus, and the first cutting apparatus are the same as mentioned above, however, the arrangements thereof are different in correspondence to the position of the first release film F12.

The first peeling apparatus, the first bonding apparatus, and the first rejection apparatus are also the same as mentioned above, in their structure and function, in the same manner, however, the arrangements thereof are different in correspondence to the position of the first release film F12. Accordingly, since the first sheet material F1 is fed in the lower portion than the optical display unit W, it is possible to maintain the cleanliness factor in the top face side of the optical display unit W high. Further, the cleanliness factor is low around the first sheet material F1, however, since the peeled first release film F12 is formed in the top face side, the problem that the contaminant is attached at a time of bonding is reduced, even if the suspended matter is attached to the first release film F12.

The second sheet material F2 is fed in a state in which the second release film F22 is set to the lower face. The second pre-inspection peeling apparatus, the second inspecting apparatus, the second release film laminating apparatus, and the second cutting apparatus are the same as mentioned above in the structures and the functions thereof, however, the arrangements thereof are different in accordance with the position of the second release film F22.

The second peeling apparatus, the second bonding apparatus, and the second rejection apparatus are also the same as mentioned above in the structures and the functions thereof, in the same manner, however, the arrangements thereof are different in accordance with the position of the second release film F22. In this arrangement, it is possible to maintain the cleanliness factor in the top face side of the optical display unit W high. Further, it is possible to maintain the cleanliness factor around the second sheet material F2 high.

A known defect inspecting method can be applied to the defect inspection. An automatic inspecting apparatus is a apparatus which automatically inspects a defect (which may be also called as a blemish) of the sheet material, and is structured such as to emit a light, acquire a reflected light image or a transmitted light image via an imaging portion such as a line sensor, a two-dimensional TV camera or the like, and carry out a defect detection based on the acquired image data. Further, the image data is acquired in a state in which a polarizing filter for inspection is interposed in a light path between a light source and an imaging portion. Generally, a polarization axis (for example, a polarization absorption axis) of the polarizing filter for inspection is arranged in such a manner as to come to a state (crossed nicols relation) being orthogonal to a polarization axis (for example, a polarization absorption axis) of the polarizing plate to be inspected. Based on the arrangement in the crossed nicols, a whole area black image is input from the imaging portion if the defect does not exist, however, if the defect exists, the corresponding portion does not come to black (is recognized as a bright spot). Accordingly, it is possible to detect the defect by setting an appropriate threshold value. In the bright spot detection as mentioned above, the defect such as the surface attached material, the internal contaminant is detected as the bright spot. Further, in addition to the bright spot detection, there is a method of detecting the contaminant by CCD imaging the transmitted image with respect to the subject so as to analyze the image. Further, there is a method of detecting the surface attached contaminant by CCD imaging the reflected light image with respect to the subject so as to analyze the image.

The description is given of the method (the half cut method) of cutting the other members of the sheet material without cutting the release film, in the cutting step mentioned above. In accordance with the structure mentioned above, it is possible to cut the optical film and the pressure-sensitive adhesive layer without cutting the release film laminated to the optical film via the pressure-sensitive adhesive layer, and peel off the release film from the optical film before the bonding step applied to the optical display unit. In other words, since the structure can be made such that the pressure-sensitive adhesive layer corresponding to the bonding surface of the optical film is not exposed until just before the bonding, it is possible to prevent the contaminant from being mixed into the bonding surface of the optical film.

Particularly, it is possible to feed the cut optical film and pressure-sensitive adhesive layer while using the release film as the carrier, by cutting the optical film and the pressure-sensitive adhesive layer without cutting the release film. Accordingly, since the feeder of the optical film can be made as a simpler structure, it is possible to further reduce the production cost of the optical display device.

(Detection Condition Correcting Process)

The detection condition of the defect in the defect inspection carried out by the first defect inspection apparatus before the first optical film F11 is bonded to the optical display unit W is structured such as to be corrected based on the result of inspection of the inspection apparatus carried out after the first optical film F11 is bonded. In the same manner, the detection condition of the defect in the defect inspection carried out by the second defect inspection apparatus before the second optical film F21 is bonded to the optical display unit W is structured such as to be corrected based on the result of inspection of the inspection apparatus carried out after the second optical film F21 is bonded. In other words, the result of inspection of the inspection apparatus is structured such as to be fed back to the defect inspection carried out by the first defect inspection apparatus and the second defect inspection apparatus. The skip cut carried out by the first cutting apparatus and the second cutting apparatus, and the rejection of the sheet materials F1 and F2 including the defects carried out by the first rejection apparatus and the second rejection apparatus are not carried out at a time of carrying out the feedback mentioned above, but are restarted after the end of the feedback mentioned above. Note that the detection condition mentioned above is a condition, for example, prescribed by a threshold value or the like, the first defect inspection apparatus detects the defect only in the case that the defect included in the first optical film F11 satisfies the detection condition mentioned above, and the second defect inspection apparatus detects the defect only in the case that the defect included in the second optical film F21 satisfies the detection condition mentioned above.

Figure 4:
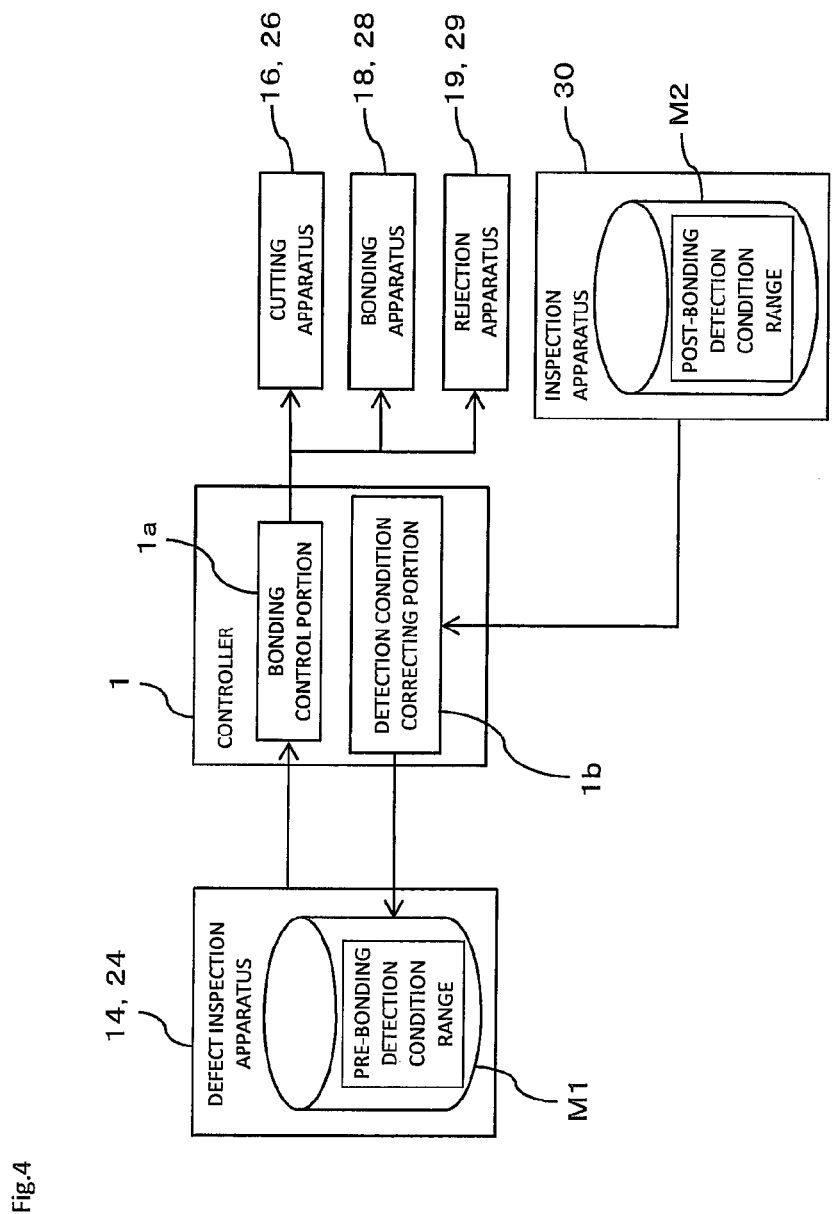
FIG. 4 is a block diagram for explaining an aspect at a time when a detection condition of a defect is corrected in a defect inspection carried out by a first defect inspection apparatus and a second defect inspection apparatus.

FIG. 4 is a block diagram for explaining an aspect at a time when a detection condition of the defect is corrected in a defect inspection carried out by a first defect inspection apparatus 14 and a second defect inspection apparatus 24. In this case, the first defect inspection apparatus 14 and the second defect inspection apparatus 24 construct optical film inspection means for inspecting the optical films F11 and F21 before being bonded to the optical display unit W so as to detect the defect. A memory M1 is provided in each of the first defect inspection apparatus 14 and the second defect inspection apparatus 24, and the memory M1 stores a range of a detection condition in which the first defect inspection apparatus 14 and the second defect inspection apparatus 24 respectively inspect the optical films F11 and F21 before being bonded to the optical display unit W so as to detect the defect (hereinafter, referred to as the "pre-bonding detection condition range").

Further, an inspection apparatus 30 constructs optical display device inspection means for inspecting the optical display device to which the optical films F11 and F21 are bonded so as to detect the defect. A memory M2 is provided in the inspection apparatus 30, and the memory M2 stores a range of a detection condition in which the inspection apparatus 30 inspects the optical display device to which the optical films F11 and F21 are bonded so as to detect the defect (hereinafter, referred to as the "post-bonding detection condition range").

A controller 1 is control means for controlling a motion of various apparatuses provided in an optical display device manufacturing system, and is structured such that a CPU provided in the controller 1 executes a computer program, thereby serving as a bonding control portion 1a, a detection condition correcting portion 1b and the like. The bonding control portion 1a carries out a control relating to the bonding of the first optical film F11 to the optical display unit W, by controlling a first cutting apparatus 16, a first bonding apparatus 18, a first rejection apparatus 19 and the like. Further, the bonding control portion 1a carries out a control relating to the bonding of the second optical film F21 to the optical display unit W, by controlling a second cutting apparatus 26, a second bonding apparatus 28, a second rejection apparatus 29 and the like.

The detection condition correcting portion 1b is detection condition correcting means for correcting the detection condition of the defect of the optical films F11 and F21 by the first defect inspection apparatus 14 and the second defect inspection apparatus 24, based on the result of inspection of the inspection apparatus 30. In other words, the detection condition correcting portion 1b carries out a correction of the pre-bonding detection condition range stored in the memory M1 by storing the pre-bonding detection condition range obtained by feeding back the result of inspection of the inspection apparatus 30 in the memory M1 of each of the first defect inspection apparatus 14 and the second defect inspection apparatus 24. At this time, the detection condition correcting portion 1b is structured such as to compare the result of inspection by the defect inspection apparatuses 14 and 24 with the result of inspection by the inspection apparatus 30, and correct the pre-bonding detection condition range in such a manner that the defect inspection apparatuses 14 and 24 and the inspection apparatus 30 extract the defect satisfying the same standard, in the optical films F11 and F21.

The cutting apparatuses 16 and 26 cut the optical films F11 and F21 while avoiding the defect portion, that is, in accordance with the skip cut, in such a manner that the defect detected by the defect inspection apparatuses 14 and 24 based on the corrected pre-bonding detection condition range stored in the memory M1 is not included in the region bonded to the optical display unit W, in accordance with the control of the bonding control portion 1a. The rejection apparatuses 19 and 29 reject the optical films F11 and F21 including the defect detected by the defect inspection apparatuses 14 and 24 based on the corrected pre-bonding detection condition range, by rejecting the optical films F11 and F21 including the defect cut by the cutting apparatuses 16 and 26.

FIG. 5 is a view for explaining a change in the pre-bonding detection condition range before and after the correction by the detection condition correcting portion 1b. As shown in FIG. 5 by hatching, the detection condition used for inspecting the defect of the first defect inspection apparatus 14 and the second defect inspection apparatus 24 is constructed by a pre-bonding detection condition range prescribed by a coordinate in which brightness difference between the defect in the optical films F11 and F21 and the periphery of the defect is set to a vertical axis, and a size (an area) of the defect is set to a horizontal axis. The detection condition used for inspecting the defect of the inspection apparatus 30 is constructed by a post-bonding detection condition range prescribed by a coordinate in which brightness difference between the defect in the optical display device to which the optical films F11 and F21 are bonded and the periphery of the defect is set to a vertical axis, and a size (an area) of the defect is set to a horizontal axis.

Specifically, the first defect inspection apparatus 14 is structured such as to detect a defect only in the case that the brightness difference of the defect included in the first optical film F11 is larger than a predetermined threshold value (hereinafter, referred to as the "brightness difference threshold value"), and the size is larger than a predetermined threshold value (hereinafter, referred to as the "size threshold value"). Further, the second defect inspection apparatus 24 is structured such as to detect a defect only in the case that the brightness difference of the defect included in the second optical film F21 is larger than the brightness difference threshold value, and the size is larger than the size threshold value.

In an example in FIG. 5(a), there is shown a case that defects P1 to P5 are detected in the pre-bonding detection condition range, as a result of the inspection of the optical films F11 and F21 by the defect inspection apparatuses 14 and 24. The pre-bonding detection condition range shown in FIG. 5(a) is a state before feeding back the result of inspection of the inspection apparatus 30 so as to correct. Thereafter, in the case that the optical films F11 and F21 are cut into the predetermined size so as to be bonded to the optical display unit W, and the defect inspection by the inspection apparatus 30 is carried out, the result of inspection of the inspection apparatus 30 is fed back, and the pre-bonding detection condition range is corrected by the detection condition correcting portion 1b.

The optical films F11 and F21 inspected by the defect inspection apparatuses 14 and 24 are identical to the optical films F11 and F21 bonded to the optical display unit W of the optical display device inspected by the inspection apparatus 30. Accordingly, if the standards (the levels) of the defect inspection apparatuses 14 and 24 and the inspection apparatus 30 are the same, the defect satisfying the same standard is detected from the optical films F11 and F21 in any inspection, and the defect of the optical display unit W can be further detected in the inspection apparatus 30. However, in this example, there is shown a case that among the defects P1 to P5 detected by the defect inspection apparatuses 14 and 24, the defects P4 and P5 are not detected in the inspection apparatus 30.

As mentioned above, there is a case that the defect detected by the defect inspection apparatuses 14 and 24 is not detected by the inspection apparatus 30, because the standard of the defect inspection before the bonding carried out by the defect inspection apparatuses 14 and 24 is set to be higher than the standard of the defect inspection after the bonding carried out by the inspection apparatus 30. In the case mentioned above, the range corresponding to the defects P4 and P5 which are not detected by the inspection apparatus 30 is excluded from the pre-bonding detection condition range, whereby the brightness difference threshold value or the size threshold value is changed. In FIG. 5(b) showing the pre-bonding detection condition range after feeding back the result of inspection of the inspection apparatus 30 so as to correct, the range excluded from the pre-bonding detection condition range is shown as a detection exclusion condition range by a broken line.

Further specifically describing an aspect at a time of correcting the pre-bonding detection condition range, in the case that the defect detected by the defect inspection apparatuses 14 and 24 is not detected by the inspection apparatus 30, the pre-bonding detection condition range is corrected based on the brightness difference and the size of the defect (hereinafter, referred to as the "non-detection defect"). For example, in the case that the other defects are not detected by the inspection apparatus 30 within the predetermined brightness difference range including the brightness difference of the non-detection defect, the brightness difference range is excluded from the pre-bonding detection condition range. Further, in the case that the other defeats are not detected by the inspection apparatus 30 in the predetermined size range including the size of the non-detection defect, the size range is excluded from the pre-bonding detection condition range. The predetermined brightness difference range or the size range may be a fixed range including the brightness difference or the size of the non-detection defect, or may be all the ranges which are smaller than the brightness difference or the size of the non-detection defect.

In the example in FIG. 5, with regard to the non-detection defect P4, the other defects are not detected by the inspection apparatus 30 in the predetermined size range including the size of the defect P4, however, the other defect P2 is detected by the inspection apparatus 30 in the predetermined brightness difference range including the brightness difference of the defect P4. Further, with regard to the non-detection defect P5, the other defects are not detected by the inspection apparatus 30 in the predetermined size range including the size of the defect P5, however, the other defect P3 is detected by the inspection apparatus 30 in the predetermined brightness difference range including the brightness difference of the defect P5. In the case mentioned above, as shown in FIG. 5(b), the predetermined size ranges respectively corresponding to the non-detection defects P4 and P5 are excluded from the pre-bonding detection condition range, however, the predetermined brightness difference ranges respectively corresponding to the non-detection defects P4 and P5 are not excluded from the pre-bonding detection condition range.

Note that in FIG. 5, there is shown the example in which the pre-bonding detection condition range is prescribed by the fixed brightness difference threshold value and the fixed size threshold value, however, the structure is not limited thereto, but may be made such that at least one of the brightness difference threshold value and the size threshold value is not the fixed value. For example, in the case that the brightness difference is detected or not detected as the defect depending on the size of the defect, even in the same brightness difference, the detection condition range is expressed by a range which is surrounded by a curved line or a bent line in place of a straight line, as is different from FIG. 5. Further, the correction of the detection condition is not limited to the structure carried out by the aspect as mentioned above, but may be structured such as to correct the detection condition by carrying out a computation, for example, using a numerical expression such as a linear expression. Further, the detection condition is not limited to the structure which is prescribed by the brightness difference and the size of the defect, but may be prescribed by the other conditions.

Figure 6:
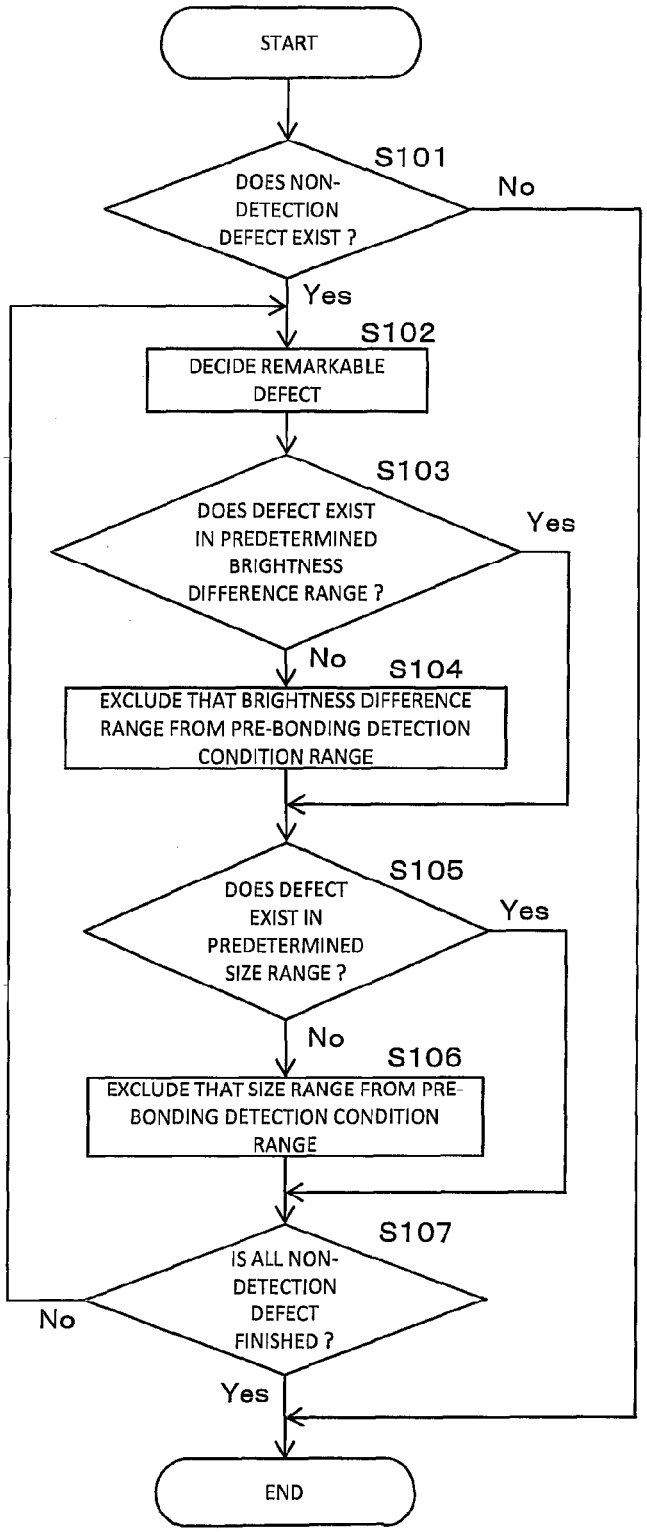
FIG. 6 is a flow chart showing one example of a process carried out by the detection condition correcting portion at a time when a result of inspection of the inspection apparatus is fed back.
Figure 7:
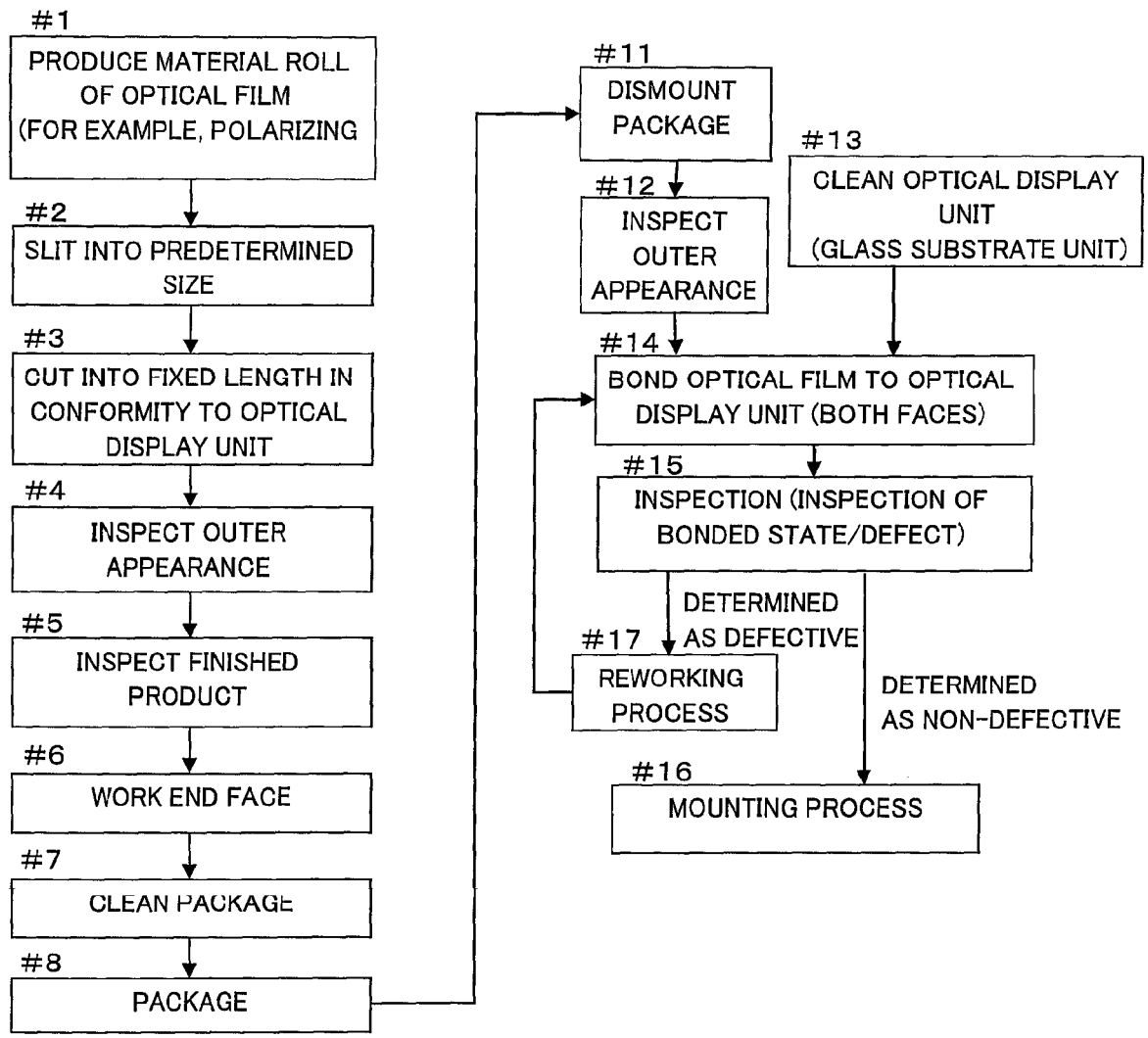
FIG. 7 is a flow chart of a manufacturing method of a conventional optical display device.

FIG. 6 is a flow chart showing an example of a process by the detection condition correcting portion 1b at a time when the result of inspection of the inspection apparatus 30 is fed back. If the result of inspection of the inspection apparatus 30 is fed back, first of all, it is determined whether or not the non-detection defect is included in the result of inspection (step S101). At this time, in the case that the non-detection defect does not exist, that is, in the case that all the defects detected by the defect inspection apparatuses 14 and 24 are detected by the inspection apparatus 30 (No in step S101), the pre-bonding detection condition range is not corrected and the process is finished.

On the other hand, in the case that the non-detection defect exists, that is, a part or all of the defect detected by the defect inspection apparatuses 14 and 24 is not detected by the inspection apparatus 30 (Yes in step S101), one of the non-detection defect is decided as a remarkable defect (step S102). In other words, in the case that the number of the non-detection defect is one, the non-detection defect is decided as the remarkable defect, and in the case that the number of the non-detection defect is two or more, any one non-detection defect is decided as the remarkable defect.

Thereafter, in the case that the other defects are not detected by the inspection apparatus 30 in the predetermined brightness difference range including the brightness difference of the remarkable defect (the non-detection defect), based on the remarkable defect (No in step S103), the brightness difference range is excluded from the pre-bonding detection condition range (step S104). Further, in the case that the other defects are not detected by the inspection apparatus 30 in the predetermined size range including the size of the remarkable defect (the non-detection defect) (No in step S105), the size range is excluded from the pre-bonding detection condition (step S106).

In the case that the number of the non-detection defect is two or more, the non-detection defects are sequentially decided as the remarkable defect, and the processes (the detection condition correcting step) of steps S103 to S106 are carried out based on the remarkable defect. Further, if the processes are finished with regard to all the non-detection defects (Yes in step S107), the correction of the pre-bonding detection condition range by the detection condition correcting portion 1b is finished.

In this example, the detection condition of the defect in the inspection of the optical films F11 and F21 before being bonded to the optical display unit W carried out by the defect inspection apparatuses 14 and 24 is corrected based on the result of inspection of the optical display device with the optical films F11 and F21 bonded, carried out by the inspection apparatus 30, and the optical films F11 and F21 including the defects detected by the defect inspection apparatuses 14 and 24 based on the corrected detection condition are excluded. Accordingly, since it is possible to adjust the standard of the defect inspection carried out by the defect inspection apparatuses 14 and 24 in conformity to the standard of the defect inspection which is later carried out by the inspection apparatus 30, it is possible to more preferably carry out the defect inspection, and it is possible to improve a yield ratio of the optical film.

Further, in the case that the defect detected by the defect inspection apparatuses 14 and 24 is not detected by the inspection apparatus 30, the condition corresponding to the defect is excluded from the detection condition of the defect inspection apparatuses 14 and 24. Accordingly, even in the case that the standard of the pre-bonding defect inspection carried out by the defect inspection apparatuses 14 and 24 is higher than the standard of the post-bonding defect inspection carried out by the inspection apparatus 30, it is possible to prevent a minor defect in the level which is not detected as the defect by the post-bonding defect inspection from being over detected in the pre-bonding defect inspection. Accordingly, it is possible to further preferably carry out the defect inspection.

In this case, in the example mentioned above, the description has been given of the structure in which the detection condition correcting portion 1b serving as the detection condition correcting means for correcting the pre-bonding detection condition range is provided in the controller 1 which is provided independently from the defect inspection apparatuses 14 and 24 and the inspection apparatus 30, however, the structure is not limited thereto, but may be made such that the detection condition correcting means is provided in the defect inspection apparatuses 14 and 24 or the inspection apparatus 30.

(Example of Structure and Producing Method of Optical Film)

First, a description will be given of a polarizing plate as one example of the optical film. The polarizing plate can be obtained by laminating, for example, a tri-acetyl cellulose (TAC) film (a polarizer protecting film) to one face of a previously produced polyvinyl alcohol film (a polarizer), and laminating a polyethylene terephthalate (PET) to the other face.

The material roll of the polarizing plate is produced, for example, in accordance with the following producing steps. (A) Step of Obtaining Polarizer, as a previous step. In this step, the polarizer is obtained by drying a polyvinyl alcohol (PVA) film to which dyeing, crosslinking and stretching steps are applied. (B) Step of Producing Polarizing Plate. In this step, the polarizing plate is produced by laminating the TAC film to one face of the polarizer via an adhesive, laminating the PET film to the other face and drying. An anti-glare processing may be previously applied to the PET film coming to a viewing side of the display device. (C) Step of Laminating Release Film (Separator) and Protection Film. The separator is laminated to the TAC film surface of the polarizing plate via a strong pressure-sensitive adhesive layer, and the surface protecting film is laminated to the PET film surface via a weak pressure-sensitive adhesive layer. In this case, the strong pressure-sensitive adhesive layer is previously coated on the separator, and the weak pressure-sensitive adhesive layer is coated on the surface protecting film. The strong pressure-sensitive adhesive layer coated on the separator is transferred to the TAC film after peeling off the separator. Further, the weak pressure-sensitive adhesive layer coated on the surface protecting film keeps being formed on the surface protecting film even after peeling off the surface protecting film, and is not substantially transferred to the PET film. In the previous step mentioned above, the long sheet material is produced, is wound as a roll shape, and is provided to the later step.

In the previous steps (A, B, C), a predetermined inspection is carried out by an inspector per each step. For example, in the case of the step (A), the inspector checks out the defect (the contaminant, the dirty, the torsion and the like) by a visual observation, in step of the feeding of the PVA material. Further, in the case of the step (B), the inspector checks out the defect (the contaminant, the dirty, the knick, the torsion, the kink and the like) at timings of the winding start and the winding end by a visual observation, at a time of winding the obtained polarizing plate material in the roll shape. Further, the polarizing plate material after being laminated is automatically inspected by the inspecting apparatus (the known apparatus for determining the defect by photographing the contaminant, the dirty and the like by the camera and image processing), and the defect is conformed by the monitor.

Further, in the case of the step (C), the inspector carries out a grading (non-defective, defective, propriety of shipment) of the sheet material by checking out the defect (the contaminant, the dirty, the torsion and the like) at timings of the winding start and the winding end by the visual observation, at a time of winding the obtained long sheet material in the roll shape, and evaluating the defect.

Next, (D) Slit Step of Material roll, as a post step. Since the material roll is wide, the material roll is slit into a predetermined size in conformity to the size of the optical display device corresponding to the final product. The slit step is omitted in some width of the material roll. Next, (E) Inspecting Step of Material roll. In this case, the visual observation inspection is carried out by a roll type automatic inspecting apparatus and/or the inspector, as an outer appearance inspection of the long sheet material. The roll type automatic inspecting apparatus is a known apparatus for determining the defect by photographing a winding fault, an outer appearance defect and the like by a camera, and image processing.

In the steps mentioned above, the produced material roll is put into a package and is shipped to the next step place. On the other hand, in the case that the bonding step to the optical display unit is carried out in the same place, it is fed to the next step in a simplified package or an untouched state.

The optical display device produced by the present invention can be applied to an image display device such as a liquid crystal display device, an organic EL display device, a PDP and the like.

The liquid crystal display device can be formed in accordance with the conventional way. In other words, the liquid crystal display device is generally formed by appropriately assembling component parts such as a liquid crystal cell (corresponding to the optical display unit), an optical film and a lighting system as occasion demands and installing a driving circuit, however, the forming way is not particularly limited in the present invention except a point that the optical film is used, and can be based on the conventional way. With regard to the liquid crystal cell, it is possible to use an optional type, for example, TN type, STN type, π type and the like.

It is possible to form an appropriate liquid crystal display device such as a liquid crystal display device in which the optical film is arranged in one side or both sides of the liquid crystal cell, one in which a backlight or a reflector is used in the lighting system, and the like. In this case, the optical film can be placed in one side or both sides of the liquid crystal cell. In the case that the optical film is provided in both sides, they may be the same or may be different. Further, at a time of forming the liquid crystal display device, it is possible to arrange appropriate parts, for example, a diffusion plate, an anti-glare layer, a anti-reflection film, a protective plate, a prism array, a lens array sheet, a light diffusion plate, a backlight and the like at appropriate positions in one layer or two layers or more.

The liquid crystal display device can be formed as a device having an appropriate structure based on conventional transmitting type, reflecting type or transmitting and reflecting both-way type in which the optical film is arranged in one side or both sides of the liquid crystal cell. Accordingly, the liquid crystal cell forming the liquid crystal display device is optional, for example, it is possible to use an appropriate type of liquid crystal cell such as an active matrix drive type represented by a thin film transistor type.

Further, in the case that the polarizing plate or the optical member is provided in both sides of the liquid crystal cell, they may be the same or may be different. Further, at a time of forming the liquid crystal display device, it is possible to arrange appropriate parts, for example, a prism array sheet, a lens array sheet, a light diffusion plate, a backlight and the like at appropriate positions in one layer or two layers or more.

DESCRIPTION OF THE SYMBOLS 1 controller
1a bonding control portion
1b detection condition correcting portion
14 first defect inspection apparatus
24 second defect inspection apparatus
30 inspection apparatus
F1 first sheet material
F2 second sheet material
F11 first optical film
F21 second optical film
W optical display unit

The invention claimed is:

1. An optical display device manufacturing method for manufacturing an optical display device by delivering an optical film from a material roll formed by winding the optical film into a roll shape, and cutting the optical film into a predetermined size so as to be bonded to an optical display unit, the method comprising:
   an optical film inspection step of inspecting the optical film before being bonded to the optical display unit so as to detect a defect;
   an optical display device inspection step of inspecting the optical display device to which the optical film is bonded so as to detect a defect;
   a detection condition correcting step of comparing a result of the inspection of the optical film and a result of the inspection of the optical display device and correcting a detection condition used in the optical film inspection step to detect a defect of the optical film, based on a result of the comparison of the inspection results; and
   a rejection step of rejecting the optical film including the defect detected in the optical film inspection step based on the corrected detection condition.

2. The optical display device manufacturing method according to claim 1, comprising a cutting step of cutting the optical film while avoiding the defect portion in such a manner that the defect detected in the optical film inspection step based on the corrected detection condition is not included in a region bonded to the optical display unit, wherein
   the rejection step is the step of rejecting the optical film including the defect and being cut in the cutting step.

3. The optical display device manufacturing method according to claim 1, wherein the detection condition correcting step is the step of comparing a result of inspection in the optical film inspection step with a result of inspection in the optical display device inspection step, and correcting the detection condition used in the optical film inspection step in such a manner that the optical film inspection step and the optical display device inspection step extract a defect satisfying a same standard in the optical film.

4. The optical display device manufacturing method according to claim 1, wherein the optical film inspection step is the step of detecting a defect only in the case that the defect included in the optical film satisfies the detection condition, and
   the detection condition correcting step is the step of excluding a condition corresponding to the defect from the detection condition in the case that the defect detected in the optical film inspection step is not detected in the optical display device inspection step.

5. The optical display device manufacturing method according to claim 1, wherein the detection condition is prescribed by brightness difference between the defect in the optical film and a periphery of the defect, and a size of the defect.

6. The optical display device manufacturing method according to claim 4, wherein said optical film inspection step inspects the optical film with a standard which is set to be higher than a standard with which said optical display device inspection step inspects the optical device.

7. An optical display device manufacturing system for manufacturing an optical display device by delivering an optical film from a material roll formed by winding the optical film into a roll shape, and cutting the optical film into a predetermined size so as to be bonded to an optical display unit, the system comprising:
   optical film inspection means for inspecting the optical film before being bonded to the optical display unit so as to detect a defect;
   optical display device inspection means for inspecting the optical display device with the optical film bonded so as to detect a defect;
   detection condition correcting means for comparing a result of the inspection of the optical film and a result of the inspection of the optical display device and for correcting a detection condition used by the optical film inspection means to detect a defect of the optical film, based on a result of the comparison of the inspection results; and
   rejection means for rejecting the optical film including the defect detected by the optical film inspection means based on the corrected detection condition,
   wherein the optical film inspection means detects a defect only in the case that the defect included in the optical film satisfies the detection condition,
   wherein the detection condition correcting means excludes a condition corresponding to the defect from the detection condition in the case that the defect detected by the optical film inspection means is not detected by the optical display device inspection means, and
   wherein a standard for said defect inspection of the optical film by the optical film inspection means is set to be higher than a standard for said defect inspection of the optical display device by the optical display device inspection means.

8. The optical display device manufacturing system according to claim 7, comprising cutting means for cutting the optical film while avoiding the defect portion in such a manner that the defect detected by the optical film inspection means based on the corrected detection condition is not included in a region bonded to the optical display unit, wherein the rejection means rejects the optical film including the defect and being cut by the cutting means.

9. The optical display device manufacturing system according to claim 7, wherein the detection condition correcting means compares a result of inspection by the optical film inspection means with a result of inspection by the optical display device inspection means, and corrects the detection condition used by the optical film inspection means in such a manner that the optical film inspection means and the optical display device inspection means extract a defect satisfying a same standard in the optical film.

10. The optical display device manufacturing system according to claim 7, wherein the detection condition is prescribed by brightness difference between the defect in the optical film and a periphery of the defect, and a size of the defect.

* * * * *